United States Patent
Wang et al.

(10) Patent No.: US 9,229,850 B1
(45) Date of Patent: Jan. 5, 2016

(54) MAPPING DATA STORAGE AND VIRTUAL MACHINES

(75) Inventors: Yidong Wang, Upton, MA (US); Neil F. Schutzman, Marlborough, MA (US); Russell R. Laporte, Webster, MA (US); Gregory W. Lazar, Upton, MA (US); Deene A. Dafoe, Shrewsbury, MA (US); Feng Zhou, Framinham, MA (US)

(73) Assignee: EMC Corporation, Hopkinton, MA (US)

( * ) Notice: Subject to any disclaimer, the term of this patent is extended or adjusted under 35 U.S.C. 154(b) by 455 days.

(21) Appl. No.: 12/495,473

(22) Filed: Jun. 30, 2009

(51) Int. Cl.
G06F 12/00 (2006.01)
G06F 12/02 (2006.01)

(52) U.S. Cl.
CPC ................... G06F 12/023 (2013.01)

(58) Field of Classification Search
None
See application file for complete search history.

(56) References Cited

U.S. PATENT DOCUMENTS

| | | | |
|---|---|---|---|
| 7,293,147 B2 * | 11/2007 | Tanaka et al. | 711/163 |
| 7,805,706 B1 * | 9/2010 | Ly et al. | 717/121 |
| 2005/0267878 A1 * | 12/2005 | Mogi et al. | 707/3 |
| 2007/0180450 A1 * | 8/2007 | Croft et al. | 718/1 |
| 2009/0119663 A1 * | 5/2009 | Mukherjee et al. | 718/1 |
| 2009/0210869 A1 * | 8/2009 | Gebhart et al. | 717/174 |
| 2009/0217021 A1 * | 8/2009 | Goodson et al. | 713/1 |
| 2009/0217263 A1 * | 8/2009 | Gebhart et al. | 718/1 |

OTHER PUBLICATIONS

VMWARE Virtualcenter Product Datasheet, copyright 1998-2007, pp. 1-3.*

* cited by examiner

*Primary Examiner* — Cheng-Yuan Tseng
*Assistant Examiner* — Craig Goldschmidt
(74) *Attorney, Agent, or Firm* — John T. Hurley; Jason A. Reyes; Krishnendu Gupta

(57) ABSTRACT

A method is used in mapping data storage and virtual machines. A logical volume from a data storage system is provided for use by a hypervisor. The hypervisor is queried through a web service to identify a virtual machine of the hypervisor. It is determined that the virtual machine is using the logical volume.

18 Claims, 33 Drawing Sheets

| ARRAY | ESX SERVER | VIRTUAL MACHINE |
|---|---|---|
| CX700_125_128 | esx 12197 | VM1 / winw2k3as1 / WINDOWS 2003 SERVER |
| StorageGroup1 / LUN1 / 0 | vmhba2:0:0 | VIRTUAL DISK / HARD DISK 1 \\.\SCSI4:0:4:0 / \\.\PhysicalDrive0 / C:\ |

FIG. 30

MAPPING DATA STORAGE AND VIRTUAL MACHINES

FIELD OF THE INVENTION

This application relates to mapping data storage and virtual machines.

BACKGROUND

Computer systems may include different resources used by one or more host processors. Resources and processors in a computer system may be interconnected by one or more communication connections. These resources may include, for example, data storage systems, such as the SYMMETRIX® (also referred to herein as Symmetrix) or CLARiiON® (also referred to herein as CLARiiON or Clariion) family of data storage systems manufactured by EMC® Corporation. These data storage systems may be coupled to one or more host processors and provide storage services to each host processor. An example data storage system may include one or more data storage devices, such as those of the Symmetrix family, that are connected together and may be used to provide common data storage for one or more host processors in a computer system.

Virtual processing such as VMWARE® (also referred to herein as VMware) is another known area that offers advantages in data processing, including in the area of apparent configuration to a user. It would be advancement in both the virtual processing and data storage arts to exploit better the respective individual capabilities for reaping more and better benefits for users in the respective fields.

SUMMARY

A method is used in mapping data storage and virtual machines. A logical volume from a data storage system is provided for use by a hypervisor. The hypervisor is queried through a web service to identify a virtual machine of the hypervisor. It is determined that the virtual machine is using the logical volume.

BRIEF DESCRIPTION OF THE DRAWING

The above and further advantages of the present invention may be better understood by referring to the following description taken into conjunction with the accompanying drawings in which identical numbers for elements appearing in different drawing figures represent identical or similar elements throughout the figures:

FIGS. 30-33 are illustrations of user interface output for use with techniques described herein.

DETAILED DESCRIPTION OF THE PREFERRED EMBODIMENTS

As described in more detail below, a storage mapping technique is provided that may be used for example in virtual server integration, e.g., to achieve end to end storage mapping from a hypervisor and its virtual machines (VMs) to disks or logical storage units (e.g., hard disks) of a data storage system ("storage array" or "array"). In at least one implementation, a storage array management agent or server utility or the hypervisor itself pushes and/or registers in-band a host name and host IP address to the storage array. From the storage array side in the implementation, a user enters credentials for accessing the hypervisor via Web or Common Information Model (CIM) service on the hypervisor, which credentials are saved on the storage array. The storage array polls the hypervisor for storage usage information and correlates the storage usage information with other information on the storage array to achieve end to end VM to storage array logical storage unit mapping.

Conventionally, to get the logical storage unit mapping of all attached hosts, the storage array requires a storage array management agent to be installed and running on each host so that the storage array can periodically poll the storage array management agents on all attached hosts. This conventional approach also provides no visibility of VMs and their device mappings.

By contrast, in accordance with the storage mapping technique, one or more implementations may be provided having one or more of the following features: a storage array management agent need not be installed and running on the hypervisor host; VMs may be visible from a storage array management interface; a hypervisor and VM hierarchy may be displayed; end to end VM to storage array logical storage unit mapping may be achieved; and virtual center and virtual client infrastructures may be accommodated and/or leveraged.

Figure 1:
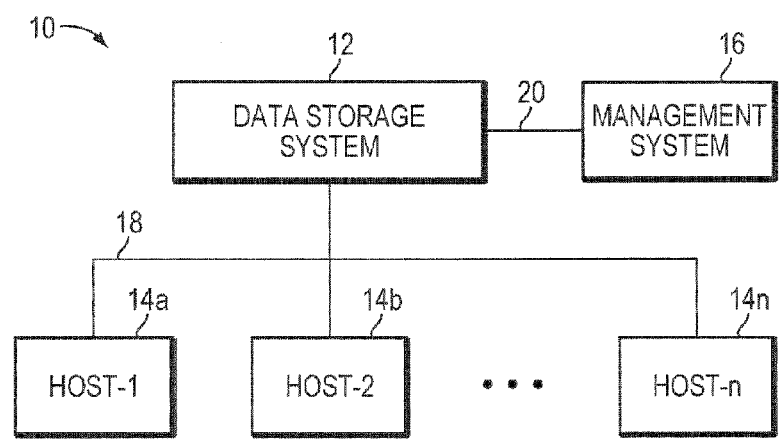
FIGS. 1-7, 9-14B, 21, 24, 26, and 29 are block diagrams of computing systems for use with techniques described herein.

Referring now to FIG. 1, shown is an example of an embodiment of a computer system that may be used in connection with performing the storage mapping technique described herein. The computer system 10 includes one or more data storage systems 12 connected to servers (also referred to as hosts or host systems) 14a-14n through communication medium 18. At least one of the host systems 14a-14n includes or provides one or more virtual machines as described below. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or Fibre Channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of a variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 and in at least one of the host computers 14a-14n are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSCI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be interconnected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes.

Figure 2:
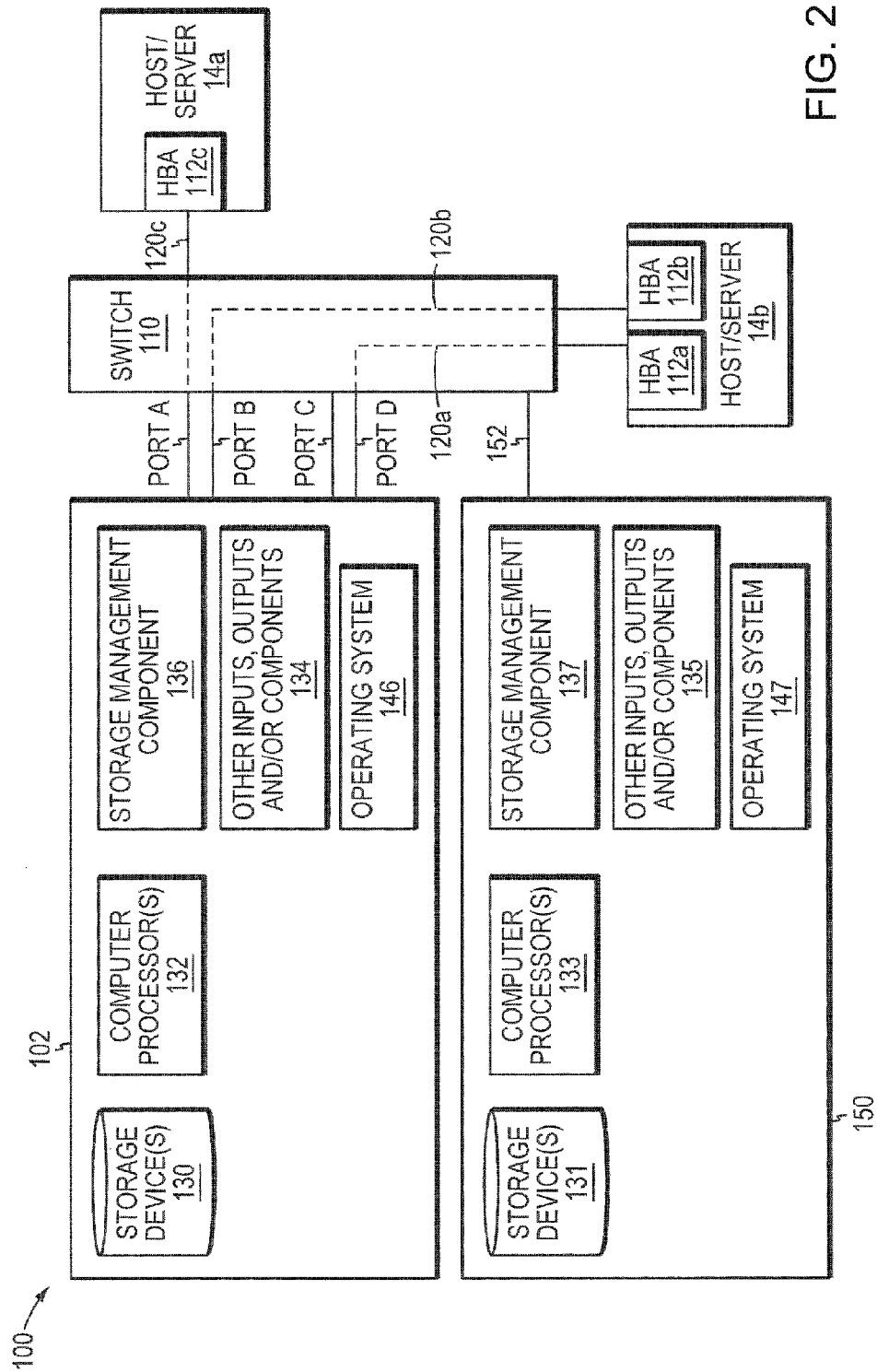

Referring now to FIG. 2, shown is an example 100 of components that may be used in connection with the storage mapping technique described herein. The example 100 may represent components illustrated in connection of FIG. 1 configured in a storage area network (SAN). Included in the example 100 are data storage systems 102 and 150, a switch 110, and hosts or servers 14a and 14b. The switch 110 may be used in connection with facilitating communications between each of the hosts 14a and 14b and the data storage systems 102 and 150. Communications between a host and the data storage system 102 may be defined in terms of a path. Host 14a communicates with the data storage system 102 over a path designated as 120c. Path 120c is formed by the starting point, the HBA or host bus adapter 112c and the ending point, port A of the receiving data storage system 102. Host 14b communicates with the data storage system 102 over two paths designated as 120a and 120b. Path 120a is formed by the starting point, the HBA 112a, and the ending point, port d of the receiving data storage system 102. Path 120b is formed by the starting point, the HBA 112b, and the ending point, port b of the receiving data storage system 102. It should be noted that different HBAs from the same or different hosts may also communicate with the data storage system through a same port of the data storage system although each path 112a, 112b, and 112c use a different port. An embodiment may represent a path using the WWN (world wide name) of a host's HBA and the WWN of a data storage system port receiving the request. As known to those skilled in the art, a WWN is a unique number assigned by a recognized naming authority that identifies a connection or a set of connections to the network. As also known to those skilled in the art, various networking technologies that may be used in an embodiment make use of WWNs.

Each HBA may include one or more ports although in the example illustrated, each HBA has only a single port. As represented with element 152, connections between the hosts using switch 110 may be made with respect to data storage system 150. Although only two data storage system are illustrated for purposes of simplicity in illustration, each of the hosts may have connections to other data storage systems in the SAN. Additionally, each host may be connected to the data storage systems 102, 150 using other connections, including direct cabling, than as illustrated in FIG. 2.

The data storage systems 102, 150 are illustrated as each including one or more storage devices 130, 131, one or more computer processors 132, 133, an operating system 146, 147, a storage management component 136, 137, and other inputs, outputs and/or components 134, 135, which may include all or some of other logic described below.

An example of an embodiment of the data storage system 102 is the CLARiiON™ data storage system by EMC Corporation which includes two computer processors as represented by the element 132 although an embodiment may include a different number of processors for use in connection with the storage mapping technique described herein.

The one or more storage devices 130 may represent one or more physical devices, such as disk drives, that may be accessed in logical units (e.g., as LUNs) as described elsewhere herein. The operating system 146 may be any one of a variety of commercially available, proprietary, or other operating system capable of execution by the one or more computer processors 132 in accordance with the particulars of the data storage system 102.

As used herein, the term network storage refers generally to storage systems and storage array technology, including storage area network (SAN) implementations, network attached storage (NAS) implementations, and other storage architectures that provide a level of virtualization for underlying physical units of storage. In general, such storage architectures provide a useful mechanism for sharing storage resources amongst computational systems. In some cases, computational systems that share storage resources may be organized as a coordinated system (e.g., as a cluster or cooperatively managed pool of computational resources or virtualization systems). For example, in a failover cluster it may be desirable to share (or at least failover) virtual machine access to some storage units. Similarly, in a managed collection of virtualization systems, it may be desirable to migrate or otherwise transition virtual machine computations from one virtualization system to another. In some cases, at least some computational systems may operate independently of each other, e.g., employing independent and exclusive units of storage allocated from a storage pool (or pools) provided and/or managed using shared network storage.

Generally, either or both of the underlying computer systems and storage systems may be organizationally and/or geographically distributed. For example, some shared storage (particularly storage for data replication, fault tolerance, backup and disaster recovery) may reside remotely from a computational system that uses it. Of course, as will be appreciated by persons of ordinary skill in the art, remoteness of shared storage is a matter of degree. For example, depending on the configuration, network storage may reside across the globe, across the building, across the data center or across the rack or enclosure.

While embodiments of the storage mapping technique, particularly cluster-organized and/or enterprise scale systems, may build upon or exploit data distribution, replication and management features of modern network storage technology, further embodiments may be used in more modest computational systems that employ network storage technology. For example, even a single computer system may employ SAN-type storage facilities in its storage architecture. Thus, while some embodiments utilize network storage that can be shared and while at least some underlying elements thereof may be remote, persons of ordinary skill in the art will understand that for at least some embodiments, network storage need not be shared or remote.

In some embodiments of the storage mapping technique, particularly those that use SAN-type storage arrays, block-level I/O access to virtual machine state data can afford performance advantages. Similarly, encapsulation and/or isolation techniques may be employed in some encodings of virtual machine state data to limit access (e.g., by a guest application or operating system) to underlying data. Accordingly, certain embodiments can be provided in which non-commingled, encapsulated representations of virtual machine state are maintained in distinct storage volumes (or LUNs) of a SAN. Nonetheless, other embodiments, including those that use NAS-type or file-system-mediated access mechanisms may still allow a virtualization system to leverage storage system functionality in support of operations such as virtual machine migration, movement, cloning, check pointing, rollback and/or failover using suitable codings of virtual machine state data.

For concreteness, embodiments are described which are based on facilities, terminology and operations typical of certain processor architectures and systems, and based on terminology typical of certain operating systems, virtualization systems, storage systems and network protocols and/or services. That said, the embodiments are general to a wide variety of processor and system architectures (including both single and multi-processor architectures based on any of a variety of instruction set architectures), to numerous operating system implementations and to systems in which both conventional and virtualized hardware may be provided. As described herein, the embodiments are also general to a variety of storage architectures, including storage virtualization systems such as those based on storage area network (SAN) or network attached storage (NAS) technologies.

Accordingly, in view of the foregoing and without limitation on the range of underlying processor, hardware or system architectures, operating systems, storage architectures or virtualization techniques that may be used in embodiments of the storage mapping technique are described. Based on these descriptions, and on the claims that follow, persons of ordinary skill in the art will appreciate a broad range of suitable embodiments.

Figure 3:
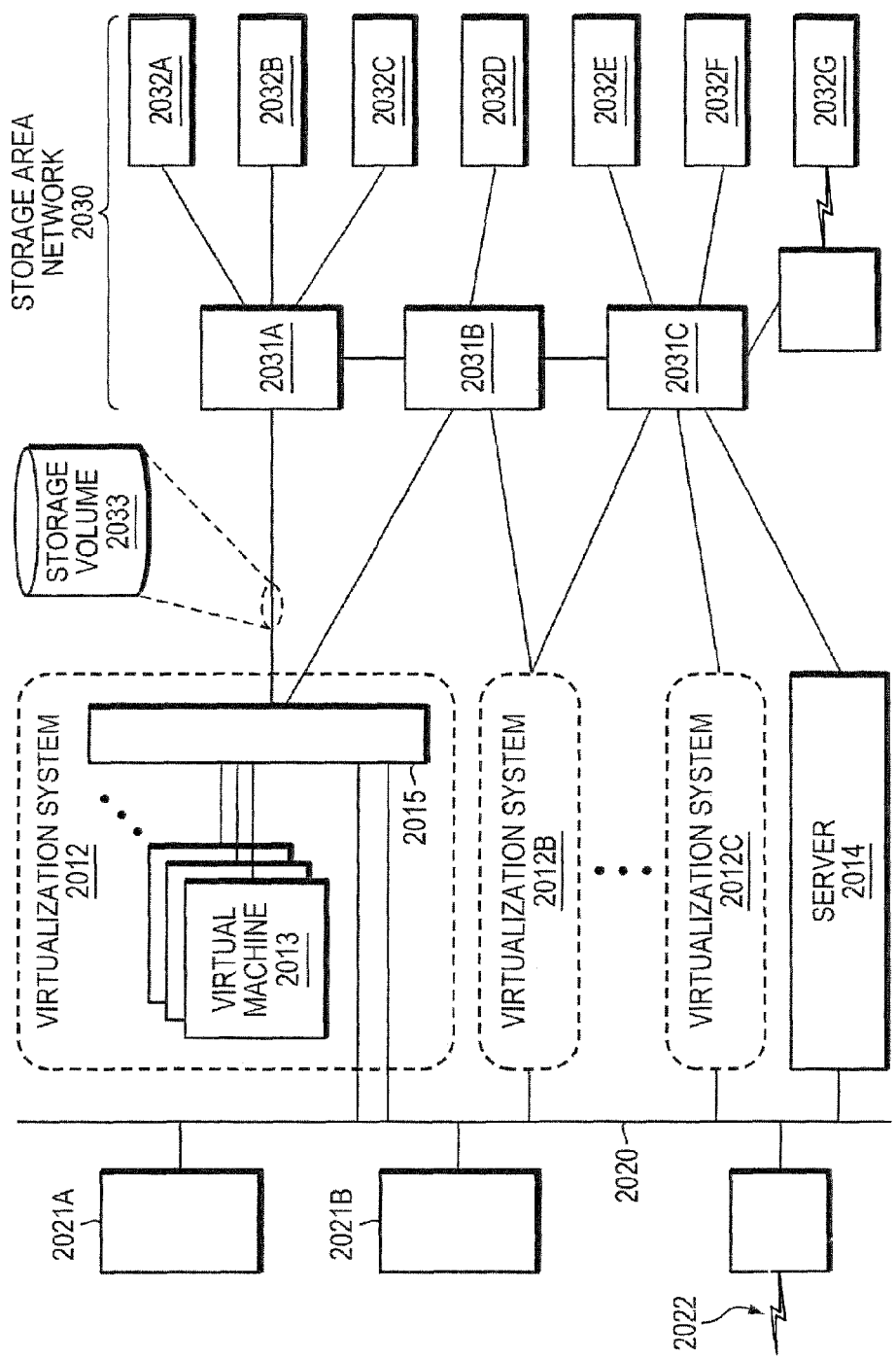

With respect to computational systems, generally, FIG. 3 depicts a collection or cluster of computational systems in which an embodiment of the storage mapping technique may be provided. In particular, FIG. 3 illustrates a collection or cluster in which at least a collection of virtualization systems 2012, 2012B, 2012C (but more generally, a mix of virtualization systems and conventional hardware systems such as server 2014) are configured to share storage resources. In the illustrated collection or cluster, constituent computational systems (e.g., virtualization systems 2012, 2012B, 2012C and server 2014) are coupled to network 2020 which is illustrated (for simplicity) as a local area network with client systems 2021A, 2021B and communications interface 2022, but will be more generally understood to represent any of a variety of networked information systems including configurations coupled to wide area networks and/or the Internet using any of a variety of communications media and protocols. One or more of systems 2012, 2012B, 2012C, 2014 may be, include, or be included in hosts 14a, 14b.

In the illustrated collection, storage area network (SAN) technology is used for at least some storage needs of computational systems participating in the collection. (The storage mapping technique can also be used for NAS storage allocated to a virtual machine environment.) In general, network storage systems (including SAN-based system 2030) provide a level of virtualization for underlying physical storage elements (e.g., individual disks, tapes and/or other media), where the characteristics and/or configuration of particular storage elements may be hidden from the systems that employ the storage. SAN-based systems typically provide an abstraction of storage pools from which individual storage units or volumes may be allocated or provisioned for block level I/O access. In the illustrated collection, a switched fabric topology consistent with Fibre Channel SAN technology is shown in which switches 2031A, 2031B, 2031C and/or directors are used to mediate high bandwidth access (typically using a SCSI, Small Computer System Interface, command set) to an extensible and potentially heterogeneous set of storage resources 2032A, 2032B, 2032C, 2032D, 2032E, 2032F, 2032G, e.g., SATA (Serial ATA) and/or SCSI disks, tape drives, as well as arrays thereof (e.g., RAID, i.e., Redundant Array of Inexpensive Disks). Such resources may be distributed and (if desirable) may provide data replication and/or off-site storage elements. Fibre Channel is a gigabit-speed network technology standardized in the T11 Technical Committee of the InterNational Committee for Information Technology Standards (INCITS). One or more of switches 2031A, 2031B, 2031C may be, include, or be included in switch 110. One or more of storage resources 2032A, 2032B, 2032C, 2032D, 2032E, 2032F, 2032G, may be, include, or be included in one or more of data storage systems 102, 150.

In general, a variety of different types of interconnect entities, including, without limitation, directors, switches, hubs, routers, gateways, and bridges may be used in topologies (or sub-topologies) that include point-to-point, arbitrated loop, switched fabric portions. Fibre Channel and non-Fibre Channel technologies including those based on iSCSI protocols (i.e., SCSI command set over TCP/IP) or ATA-over-ethernet (AoE) protocols may be used in embodiments of the storage mapping technique. Similarly, any of a variety of media including copper pair, optical fiber, etc. may be used in a network storage system such as SAN 2030.

Although not specifically illustrated in FIG. 3, persons of ordinary skill in the art will recognize that physical storage is typically organized into storage pools, possibly in the form of RAID groups/sets. Storage pools are then subdivided into storage units (e.g., storage volumes 2033 that are exposed to computer systems, e.g., as a SCSI LUN on a SAN communicating via Fibre Channel, iSCSI, etc.). In some environments, storage pools may be nested in a hierarchy, where pools are divided into sub-pools. In at least some cases, the term LUN may represent an address for an individual storage unit, and by extension, an identifier for a virtual disk of other storage device presented by a network storage system such as SAN 2030.

Embodiments of the storage mapping technique may be understood in the context of virtual machines 2013 (or virtual computers) that are presented or emulated within a virtualization system such as virtualization system 2012 executing on underlying hardware facilities 2015. However, in addition, migration from (or to) a computational system embodied as a conventional hardware-oriented system may be supported in some systems configured in accordance with the storage mapping technique. Nonetheless, for simplicity of description and ease of understanding, embodiments are described in which individual computational systems are embodied as virtualization systems that support one or more virtual machines.

Although certain virtualization strategies/designs are described herein, virtualization system 2012 is representative of a wide variety of designs and implementations in which underlying hardware resources are presented to software (typically to operating system software and/or applications) as virtualized instances of computational systems that may or may not precisely correspond to the underlying physical hardware.

With respect to virtualization systems, the term virtualization system as used herein refers to any one of an individual computer system with virtual machine management functionality, a virtual machine host, an aggregation of an individual computer system with virtual machine management functionality and one or more virtual machine hosts communicatively coupled with the individual computer system, etc. Examples of virtualization systems include commercial implementations, such as, for example and without limitation, VMware® ESX® Server (VMware and ESX Server are trademarks of VMware, Inc.), VMware® Server, and VMware® Workstation, available from VMware, Inc., Palo Alto, Calif.; operating systems with virtualization support, such as Microsoft® Virtual Server 2005; and open-source implementations such as, for example and without limitation, available from XenSource, Inc.

As is well known in the field of computer science, a virtual machine is a software abstraction—a "virtualization"—of an actual physical computer system. Some interface is generally provided between the guest software within a VM and the various hardware components and devices in the underlying hardware platform. This interface—which can generally be termed "virtualization layer"—may include one or more software components and/or layers, possibly including one or more of the software components known in the field of virtual machine technology as "virtual machine monitors" (VMMs), "hypervisors," or virtualization "kernels."

Because virtualization terminology has evolved over time, these terms (when used in the art) do not always provide clear distinctions between the software layers and components to which they refer. For example, the term "hypervisor" is often used to describe both a VMM and a kernel together, either as separate but cooperating components or with one or more VMMs incorporated wholly or partially into the kernel itself. However, the term "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs is sometimes included in the host OS itself.

Embodiments are described and illustrated herein primarily as including one or more virtual machine monitors that appear as separate entities from other components of the virtualization software. This paradigm for illustrating virtual machine monitors is only for the sake of simplicity and clarity and by way of illustration. Differing functional boundaries may be appropriate for differing implementations. In general, functionality and software components/structures described herein can be implemented in any of a variety of appropriate places within the overall structure of the virtualization software (or overall software environment that includes the virtualization software).

With respect to the virtual machine monitor, in view of the above, and without limitation, an interface usually exists between a VM and an underlying platform which is responsible for executing VM-issued instructions and transferring data to and from memory and storage devices or underlying hardware. A VMM is usually a thin piece of software that runs directly on top of a host, or directly on the hardware, and virtualizes at least some of the resources of the physical host machine. The interface exported to the VM is then the same as the hardware interface of a physical machine. In some cases, the interface largely corresponds to the architecture, resources and device complements of the underlying physical hardware; however, in other cases it need not.

The VMM usually tracks and either forwards to some form of operating system, or itself schedules and handles, all requests by its VM for machine resources, as well as various faults and interrupts. An interrupt handling mechanism is therefore included in the VMM. As is well known, in the Intel IA-32 ("x86") architecture, such an interrupt/exception handling mechanism normally includes an interrupt descriptor table (IDT), or some similar table, which is typically a data structure that uses information in the interrupt signal to point to an entry address for a set of instructions that are to be executed whenever the interrupt/exception occurs. In the Intel IA-64 architecture, the interrupt table itself contains interrupt handling code and instead of looking up a target address from the interrupt table, it starts execution from an offset from the start of the interrupt when a fault or interrupt occurs. Analogous mechanisms are found in other architectures. Based on the description herein, interrupt handlers may be adapted to correspond to any appropriate interrupt/exception handling mechanism.

Although the VM (and thus applications executing in the VM and their users) cannot usually detect the presence of the VMM, the VMM and the VM may be viewed as together forming a single virtual computer. They are shown and described herein as separate components for the sake of clarity and to emphasize the virtual machine abstraction achieved. However, the boundary between VM and VMM is somewhat arbitrary. For example, while various virtualized hardware components such as virtual CPU(s), virtual memory, virtual disks, and virtual device(s) including virtual timers are presented as part of a VM for the sake of conceptual simplicity, in some virtualization system implementations, these "components" are at least partially implemented as constructs or emulations exposed to the VM by the VMM. One advantage of such an arrangement is that the VMM may be set up to expose "generic" devices, which facilitate VM migration and hardware platform-independence. In general, such functionality may be said to exist in the VM or the VMM.

Figure 4:
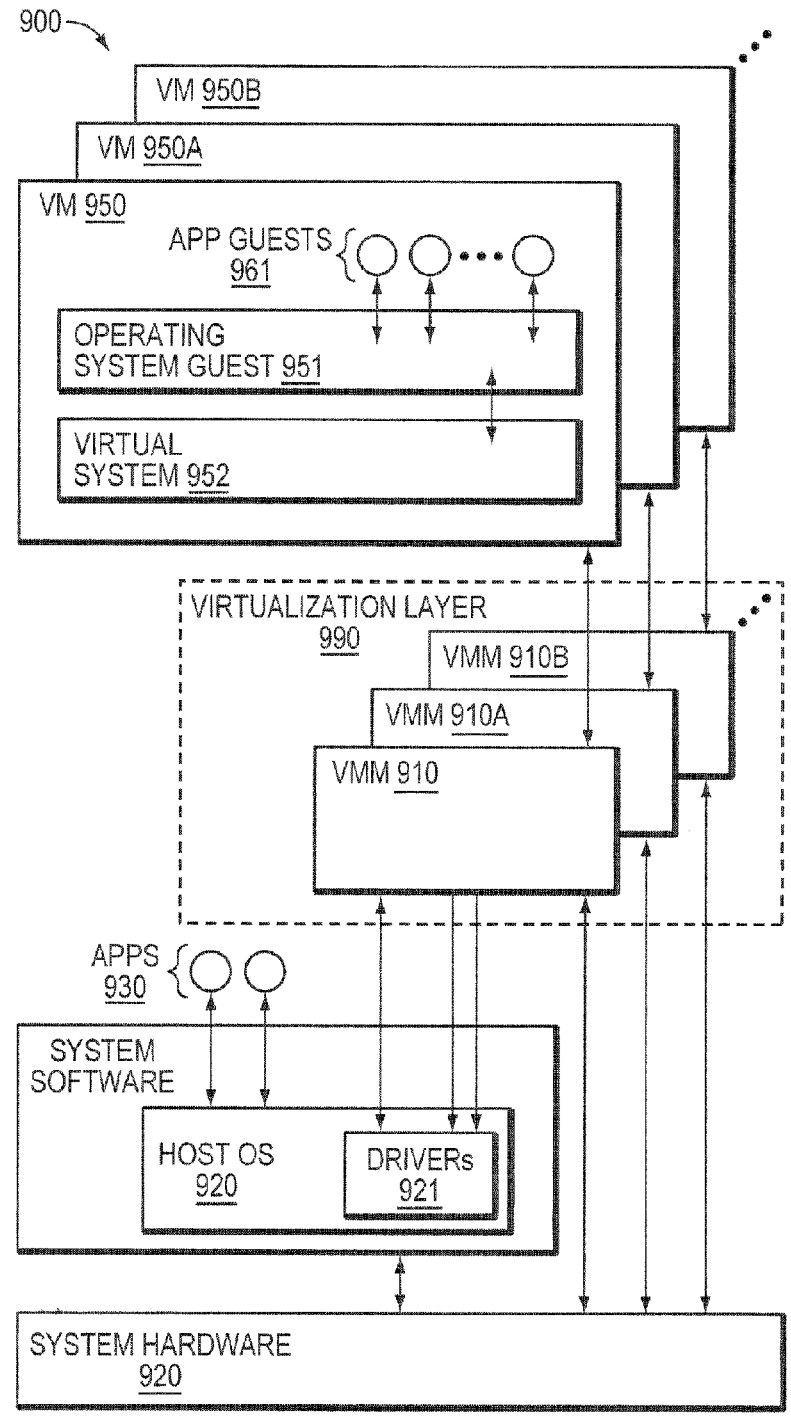
Figure 5:
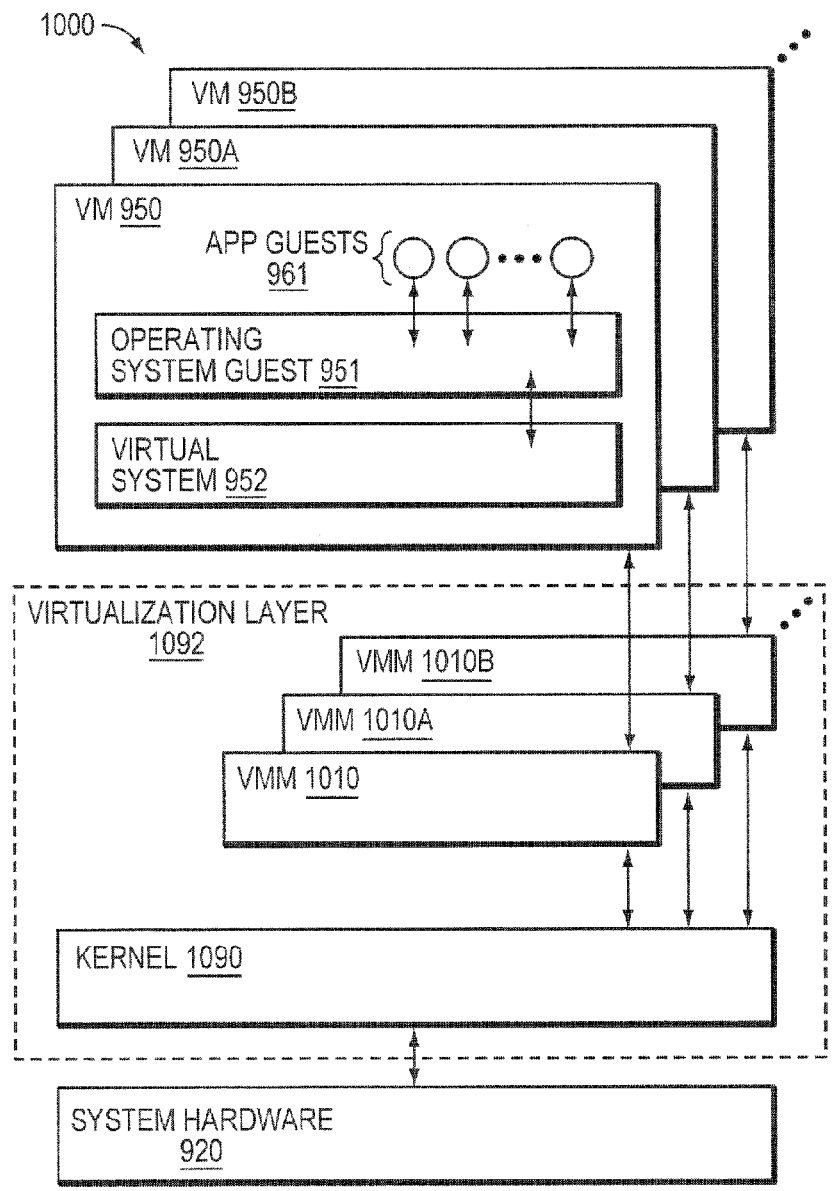

It is noted that while VMMs have been illustrated as executing on underlying system hardware, many implementations based on the basic abstraction may be implemented. In particular, some implementations of VMMs (and associated virtual machines) execute in coordination with a kernel that itself executes on underlying system hardware, while other implementations are hosted by an operating system executing on the underlying system hardware and VMMs (and associated virtual machines) executed in coordination with the host operating system. Such configurations, sometimes described as "hosted" and "non-hosted" configurations, are illustrated in FIGS. 4 and 5. However, the description herein refers to the physical system that hosts a virtual machine(s) and supporting components, whether in the "hosted" or "non-hosted" configuration, as a virtual machine host. To avoid confusion, the "hosted" configuration will be referred to herein as "OS hosted" and the "non-hosted" configuration will be referred to as "non-OS hosted." In the "OS hosted" configuration, an existing, general-purpose operating system (OS) acts as a "host" operating system that is used to perform certain I/O operations. In the "non-OS hosted" configuration, a kernel customized to support virtual machines takes the place of the conventional operating system.

With respect to OS hosted virtual computers, FIG. 4 depicts an embodiment of a virtualization system configuration referred to as an "OS hosted" configuration. Virtualization system 900 includes virtual machines 950, 950A, and 950B and respective virtual machine monitors VMM 910, VMM 910A, and VMM 910B. Virtualization system 900 also includes virtualization layer 990, which includes VMMs 910, 910A, and 910B. VMMs 910, 910A, and 910B are co-resident at system level with host operating system 920 such that VMMs 910, 910A, and 910B and host operating system 920 can independently modify the state of the host processor. VMMs call into the host operating system via driver 921 and a dedicated one of user-level applications 930 to have host OS 920 perform certain I/O operations on behalf of a corresponding VM. Virtual machines 950, 950A, and 950B in this configuration are thus hosted in that they run in coordination with host operating system 920. Virtual machine 950 is depicted as including application guests 961, operating system guest 951, and virtual system 952. Virtualization systems that include suitable facilities are available in the marketplace. For example, VMware® Server virtual infrastructure software available from VMware, Inc., Palo Alto, Calif. implements an OS hosted virtualization system configuration consistent with the illustration of FIG. 4; and VMware® Workstation desktop virtualization software, also available from VMware, Inc. also implements a hosted virtualization system configuration consistent with the illustration of FIG. 4.

With respect to non-OS hosted virtual computers, FIG. 5 depicts an embodiment of a virtualization system configuration referred to as a "non-OS hosted" virtual machine configuration. In FIG. 5, virtualization system 1000 includes virtual machines 950, 950A, and 950B as in FIG. 4. In contrast to FIG. 4, virtualization layer 1092 of FIG. 5 includes VMMs 1010, 1010A, and 1010B, and dedicated kernel 1090. Dedicated kernel 1090 takes the place, and performs the conventional functions, of a host operating system. Virtual computers (e.g., VM/VMM pairs) run on kernel 1090. Virtualization systems that include suitable kernels are available in the marketplace. For example, ESX Server™ virtual infrastructure software available from VMware, Inc., Palo Alto, Calif. implements a non-hosted virtualization system configuration consistent with the illustration of FIG. 5.

Different systems may implement virtualization to different degrees—"virtualization" generally relates to a spectrum of definitions rather than to a bright line, and often reflects a design choice in respect to a trade-off between speed and efficiency and isolation and universality. For example, "full virtualization" is sometimes used to denote a system in which no software components of any form are included in the guest other than those that would be found in a non-virtualized computer; thus, the OS guest could be an off-the-shelf, commercially available OS with no components included specifically to support use in a virtualized environment.

With respect to para-virtualization, as the term implies, a "para-virtualized" system is not "fully" virtualized, but rather a guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software. For some, the term para-virtualization implies that the OS guest (in particular, its kernel) is specifically designed to support such an interface.

According to this definition, having, for example, an off-the-shelf version of Microsoft Windows XP as the OS guest would not be consistent with the notion of para-virtualization. Others define the term para-virtualization more broadly to include any OS guest with any code that is specifically intended to provide information directly to the other virtualization software. According to this definition, loading a module such as a driver designed to communicate with other virtualization components renders the system para-virtualized, even if the OS guest as such is an off-the-shelf, commercially available OS not specifically designed to support a virtualized computer system.

Unless otherwise indicated or apparent, virtualized systems herein are not restricted to use in systems with any particular "degree" of virtualization and are not to be limited to any particular notion of full or partial ("para-") virtualization.

In the preferred embodiment, the embodiment operates in cooperation and may be a part of computer software, operating the preferred EMC CLARiiON or Symmetrix storage systems available from EMC Corporation of Hopkinton, Mass., although one skilled in the art will recognize that the storage mapping technique may be used with other data storage systems. In the preferred embodiment, EMC CLARiiON storage system implements aspects of the storage mapping technique as part of software that operates with such a storage system.

In the preferred embodiment, VMware virtual processing includes the VMware ESX Server technology and provides a VMM and a VM that has at least one virtual processor and is operatively connected to the VMM for running a sequence of VM instructions, which are either directly executable or non-directly executable. VMware technology, including the ESX server, is described in U.S. Pat. No. 6,397,242 to Devine et. al, issued May 28, 2002, which is hereby incorporated in its entirety by this reference.

Figure 6:
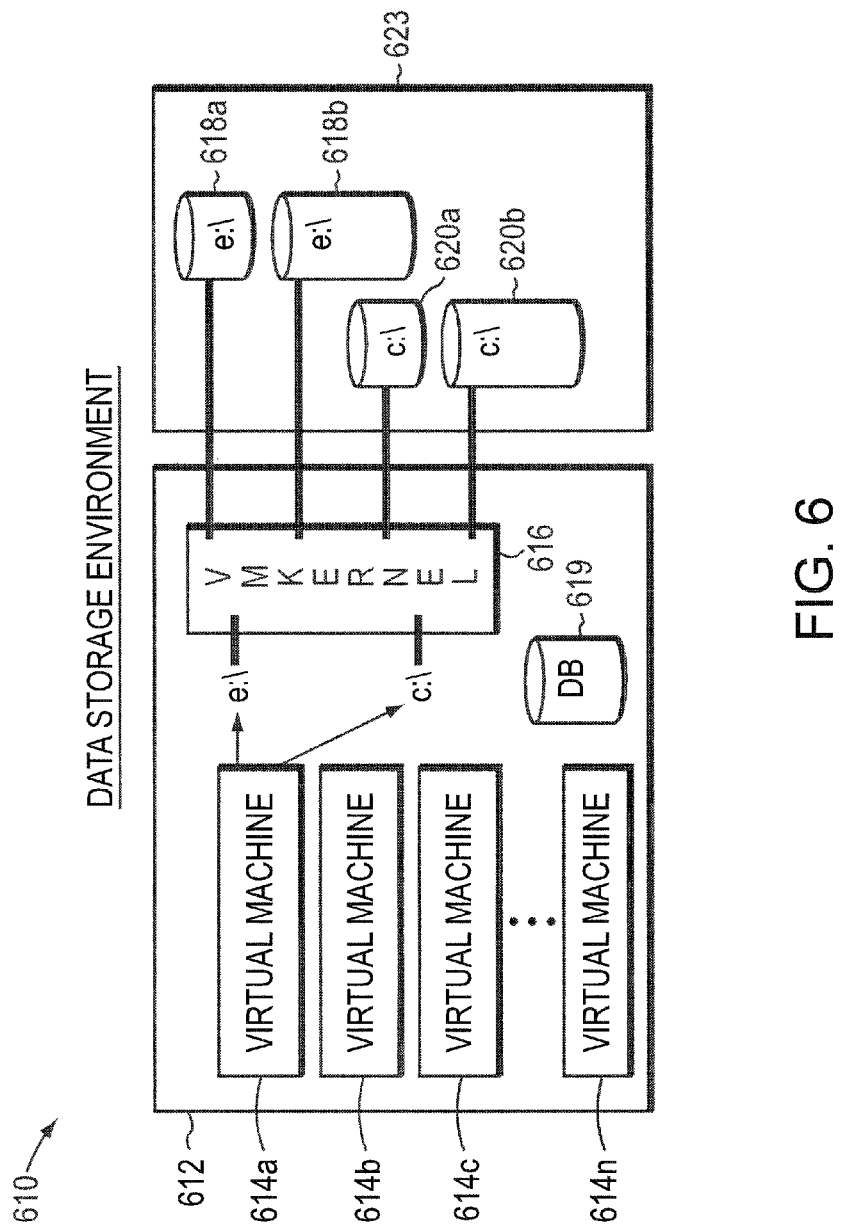

In a preferred embodiment, referring to FIG. 6, a Data Storage Environment 610 is shown including a VMware ESX Server 612 having a series of Virtual Machines 614*a-n*, a database 619 and VM Kernel 616. Server 612 engages on Data Storage System 623 logical units 618*a-b* and 620*a-b*, designated with virtual drive designations e:\ and c:\, respectively.

The VMware ESX Server is configured to boot Virtual Machines (VMs) from external storage. In the example case of a preferred embodiment shown in FIG. 6, a Data Storage System 623 (e.g., EMC CLARiiON) contains both the boot volume (c:\) and another volume (e:\) for a preferred Windows 2000 VM. Any VMware-supported Guest operating system would work in view of the teachings herein. Currently, such Guest operating systems include most of the popular x86 operating systems, including Windows and Linux. Similarly, additional drives could be added, up to half the supported number of Logical Unit Numbers (LUNs) on an ESX Server.

Figure 7:
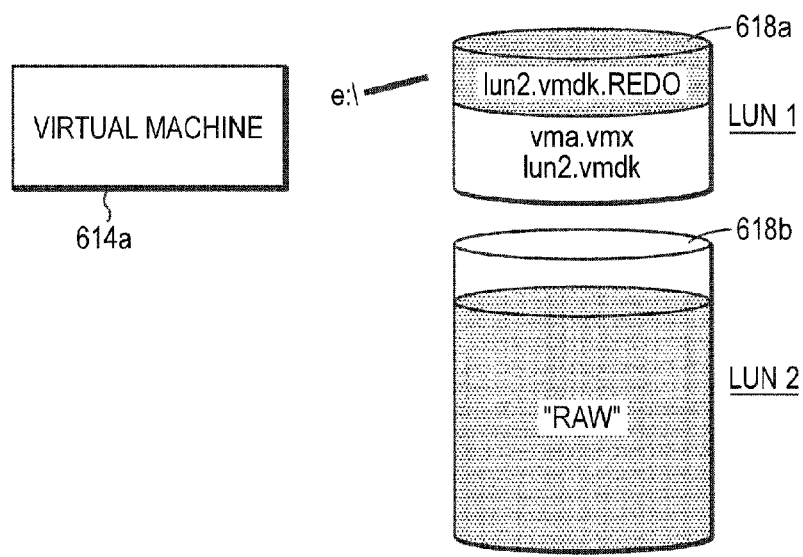

Regarding FIG. 7, taking a closer look at one of the volume pairs that has been discussed with reference to FIG. 6, it can be seen that logical volume 618*a* also known as LUN 1 has the VMware VM configuration (.vmx) file. It also has the two other files that comprise the e:\ drive for Virtual Machine 614*a*. First, LUN 1 has a pointer—called lun2.vmdk—to the "raw disk" at logical volume 18*a* also known as LUN 2, where most of the data resides. Second, there is a standard VMware ESX Server ".REDO log" on LUN 1. This .REDO log contains tracks that have been changed since the last time a .REDO log had been written out, or flushed, to LUN 2. This uses the preferred VMware VMFS "raw disk mapping" (RDM) functionality. The VMkernel 616 of FIG. 6 presents one e:\ drive to the Virtual Machine 614*a* from a combination of data it finds on the two LUNs 618*a* and 618*b*.

Figure 9:
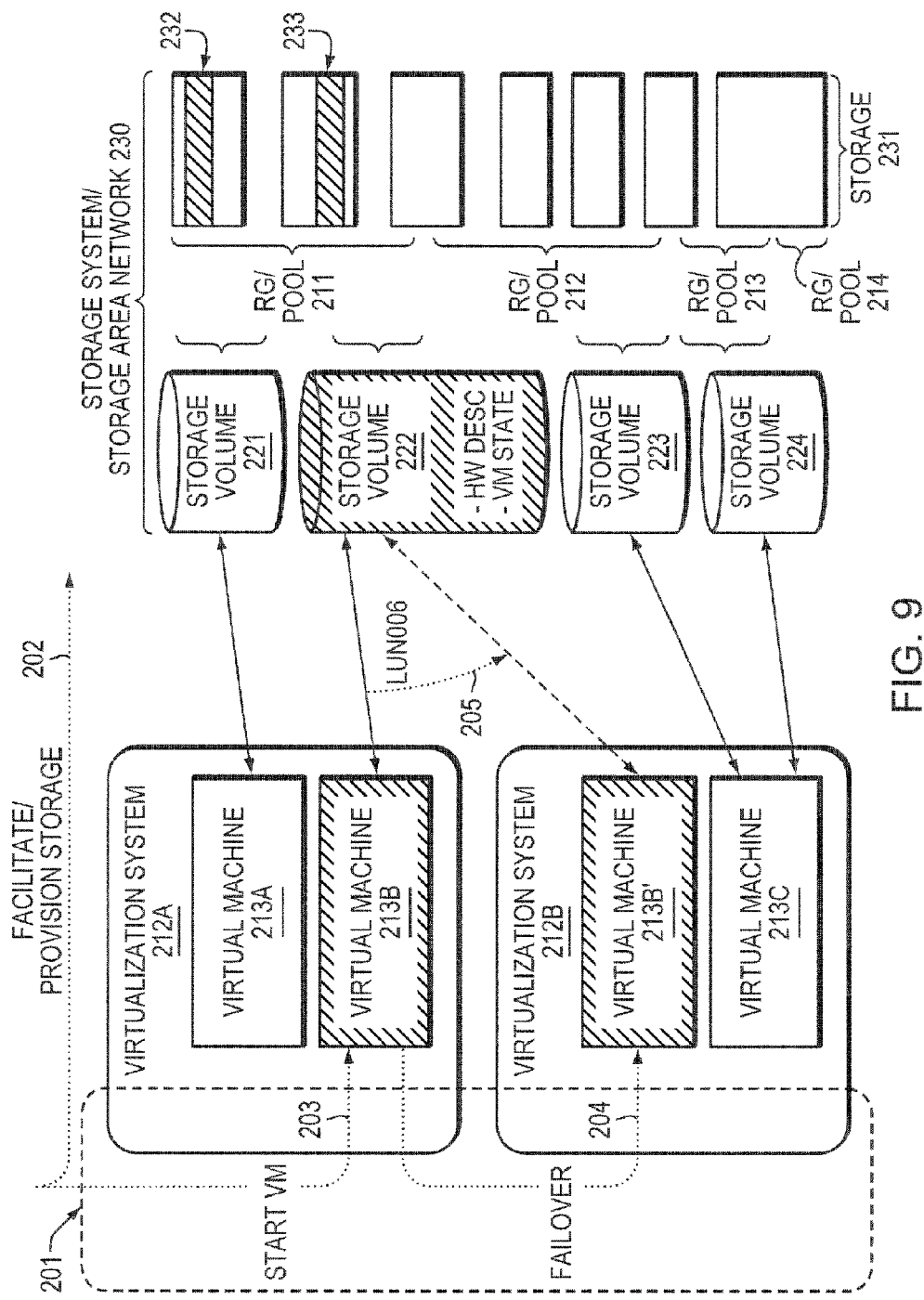

FIG. 9 illustrates an embodiment in which a coordination and provisioning system 201 (such as VMware® Virtual Center) is employed to facilitate provisioning of storage (202), e.g., LUNs, derived from underlying storage media 231 (and RAID groups (RGs) or pools 211, 212, 213 and 215) of storage system or storage area network (SAN) 230 and to provision, control and coordinate (see 203) execution of virtual machine instances (e.g., VMs 213A, 213B, 213C and 213D) on respective virtualization systems 212A and 212B.

Thus, for example, portions 232 and 233 of storage 231 may be provisioned from RAID group or pool 211 as storage volume 222 (LUN006) which may encode an encapsulation of an exposed virtual disk(s) and virtual machine state. System 201 may be used to handle a failover situation (204) for the virtual machine instances so that, for example, virtual machine instance 213B' can take over for a failed virtual machine instance 213B using LUN006.

In general, Virtual Center manages virtual machines, and each virtual machine has a unique identifier and information about its virtual devices, including virtual disks.

Figure 10:
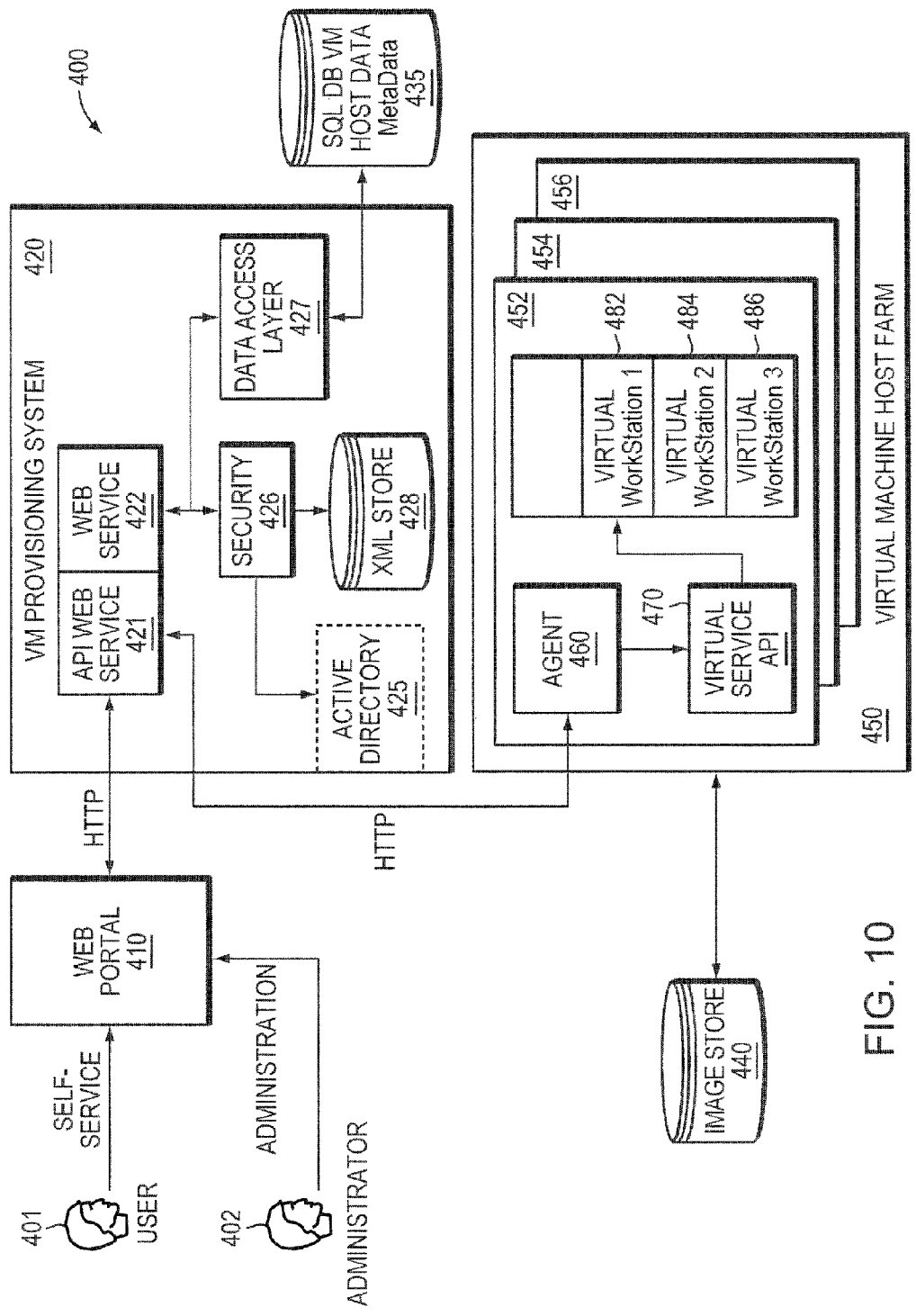

FIG. 10 depicts an operating environment 400 including modules that support system functionality. Provisioning system 420 may be, include, or be included in coordination and provisioning system 201. An administrator 402 and an end user 401 may accesses the provisioning system 420 through a common web portal 410. Alternatively, the administrator 402 and end user 401 may access the system through different web servers.

In this exemplary embodiment, the provisioning system 420 includes an API web services module 421 and a web service 422. The API web services module 421 interacts with the web portal 410 and the agent 460.

A data access layer 427 provides access to a database 435 that stores data used by the provisioning system 420. This data include names of physical and virtual resources, templates, groups, reservations, allocations, and the status of each resource. Queries to the database 435 provides an instant snapshot of the use of all real and virtual resources.

An exemplary security module 426 controls what parameters an end user, such as end user 401, can control for a specific virtual machine and these parameters could vary by groups of users or individual users. For example, one type of user may not be allowed to turn off their virtual machines because regulatory requirements may mandate that the machines remain on to protect forensic data. The security module 426 affects what information and options are rendered on the web page shown to the user 401, thus controlling the options available to that user. The XML store 428 includes security roles and descriptions. It includes, in XML form, definitions of each role, task, and operation that can be performed on the provisioning system 420. It maps to the active directory 425. The active directory 425 includes the security authorization identity (e.g., username and password) for each user, security groupings for users, and information on each active virtual and real computer resource.

An image store 440, which may reside on a server such as file server 180, includes the images for the types of virtual machines that can be created. An image is a copy of the software and associated data that forms a machine's hard drive. Through the use of the image store, specific configurations of software can be copies to the storage drives of the physical hosts that represent a virtual machine. For example, the physical host 452 operates VMWARE. The agent 460, which may reside on physical host 452, receives instructions from the provisioning system 420 to create a virtual machine.

Alternatively, the agent 460 may reside on a proxy server and interact with the physical host 452 and virtual machines on that physical host 452 remotely. The instructions include details on the type of machine to be created, such as memory and storage characteristics. The agent 460 would interact with the image store 440 to copy the image of the software that defines the virtual machine onto a hard drive for the physical host 452. The image may be for virtual workstations, such as virtual workstation 482, 484, 486, or a virtual server (not shown).

The agent 460 also interacts through a virtual service API 470. The virtual service API 470 is the interface for the agent to communicate with the virtualization software running on the physical host 452. The virtual service API 470 would be unique to a type of virtualization software and the agent 460 would be designed to interact with that specific virtual service API 470. Physical hosts 454, 456 may run different virtualization software from physical host 452 and, as such, would have different agents and virtual service APIs (not shown). In this way, a virtual machine host farm 450 may operate diverse virtualization software and host diverse virtual machines. Indeed, the virtual machine host farm 450 may be in physically diverse places, such that a set of physical hosts resides in one location and another set resides in a different location. These distributed hosts would be connected to the provisioning system 420 through a communications link, such as over the internet.

Typically, the user 401 can request the creation of a virtual machine, extend or end a lease of a virtual machine, and otherwise manage virtual machines that the user 401 has created. The provisioning system 420 can interact with an agent, such as agent 460, to create and manage virtual resources other than virtual machines, such as virtual storage and virtual networks (multiple virtual machines networked together).

Figure 11:
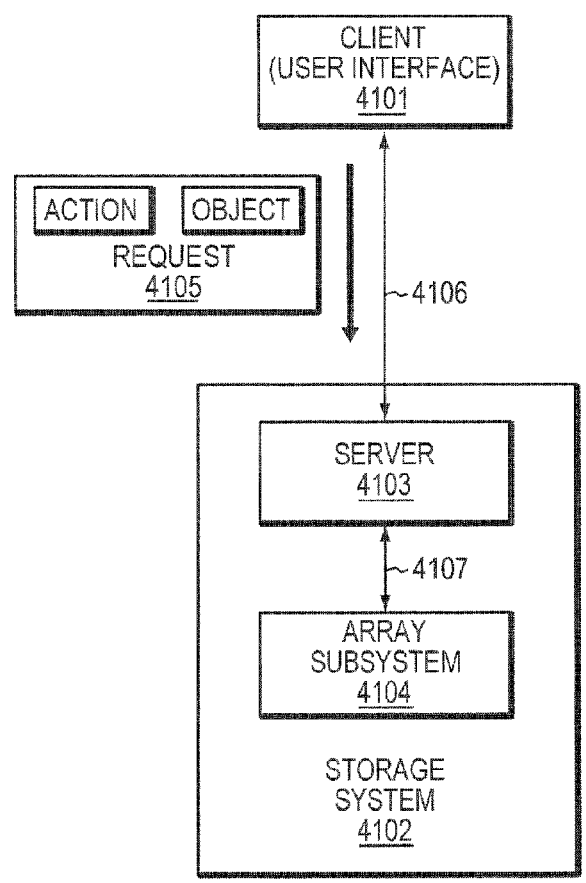

More particularly with respect to data storage used in the system, FIG. 11 is an exemplary block diagram of a typical client-server storage network which may be used with the system described above and which may be enhanced by incorporating therein embodiments of the storage mapping technique as described below. Client 4101 may be a typical workstation or graphical user interface (GUI) operatively coupled to storage system 4102 which may be, for example, similar to those manufactured by EMC Corporation. Storage system 4102 may be, include, or be included in one or more of storage system entities 12, 102, 150, 2030, 230, 623 described above. This coupling can be achieved via link 4106 which can be, for example, a hyper text transfer protocol (HTTP) link (preferably HTTPs (HTTP over SSL) in at least some embodiments). Storage system 4102 includes management server 4103 operatively coupled to array subsystem 4104 by way of link 4107 which can be, for example, an IOCTL protocol link (IOCTL means Input/Output Control, which is a well known protocol or special application programmers' interface for passing messages between software processes). Server 4103 receives input requests, such as request 4105, from client 4101 and serves-up responses to those requests from array subsystem 4104. Request 4105 can be coded in, for example, XML language. Array subsystem 4104 may be a typical RAID configuration. Client request 4105 is shown containing an action and an object, and is intended to represent a request or command by client 4101 to take that specific action upon that specific object.

Requests, such as request 4105, from client 4101, may be honored or responded to. In general, with reference also to FIG. 12 described in more detail below, each of the providers 4204-4206 is software functionality which acts independently on its own set of objects. For example, a provider may act on a set of LUNs and may know only about its own set of objects or LUNs, but sets of objects for different providers may intersect. Every object initially belongs to one and only one provider, but each object can be referenced by more than one provider, and in that sense, can belong to more than one provider. In other words, each provider can grow its set of objects by extending its domain, or sphere of influence, over objects that initially belonged only to other providers. Every provider can perform operations on all of the objects in its set, regardless of whether that object was in its set initially or resulted from an extension of its domain.

Figure 12:
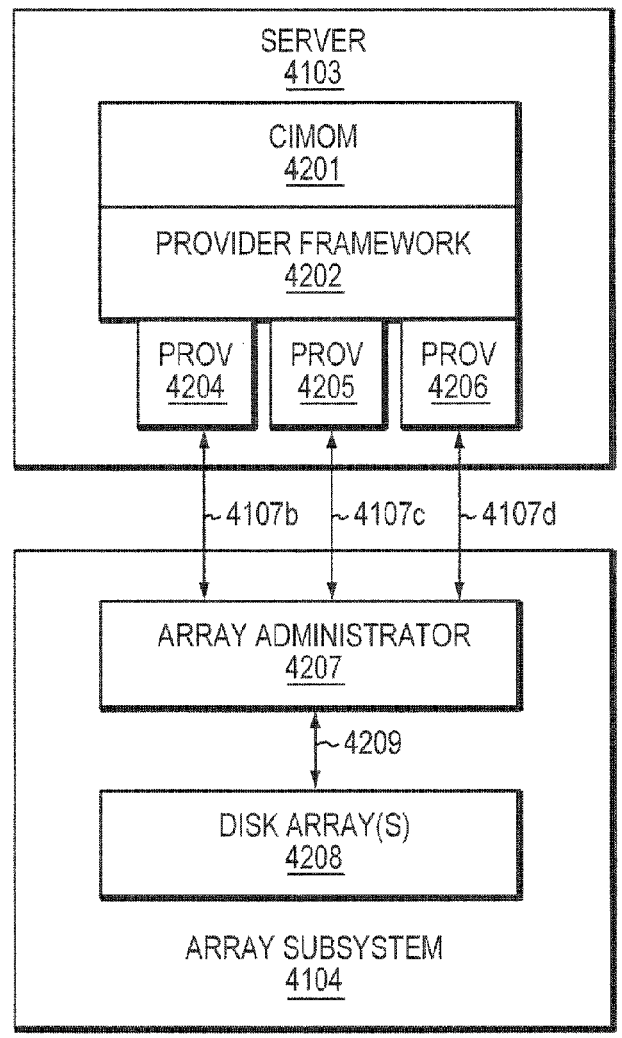

FIG. 12 is an exemplary block diagram of a storage system reflecting embodiments of the storage mapping technique. Server 4103 includes CIMOM 4201, provider framework 4202 and a number of providers 4203-4206, including a server provider as describe more below. It should be understood that many more, or fewer, providers can be used. Array subsystem 4104 includes an array administration interface or array administrator 4207 and disk array(s) 4208. CIMOM 4201 is an object manager configured in accordance with the Storage Network Industry Association Common Information Model (SNIA/CIM) standard or protocol and receives requests such as request 4105 from client 4101. CIMOM 4201 provides a framework for services offered by providers that plug into it, such as provider framework 4202 with which it is operatively coupled. A provider is a plug-in into the CIMOM that provides a specific service, such as managing a storage feature.

Providers 4203-4206 may be implemented as dynamic link libraries (DLLs) loaded into the CIMOM process. Accordingly, they can "plug in" to provider framework 4202 in a modular fashion and are thereby communicatively coupled to CIMOM 4201. The providers may also be communicatively coupled to each other through CIMOM 4201. Providers 4204-4206 may be removed, depending on whether or not their functionality is essential for operation of the system and others (not shown) may be added by plugging-in to framework 4202.

Array administrator or administration interface 4207 is the interface through which all storage system management is performed, regardless of which array feature or driver may be targeted. Providers 4204-4206 are communicatively coupled by way of inter-process communication links 4107b-4107d to array administration interface 4207. Thus, on the client side of the interface, it may be accessed using application programmer interface (API) calls. On the array side of the interface it may use IOCTL calls to communicate with the managed drivers. Link 4209 operatively couples array administrator 4207 to disk array(s) 4208 which, therefore, can be an IOCTL link.

Figure 13:
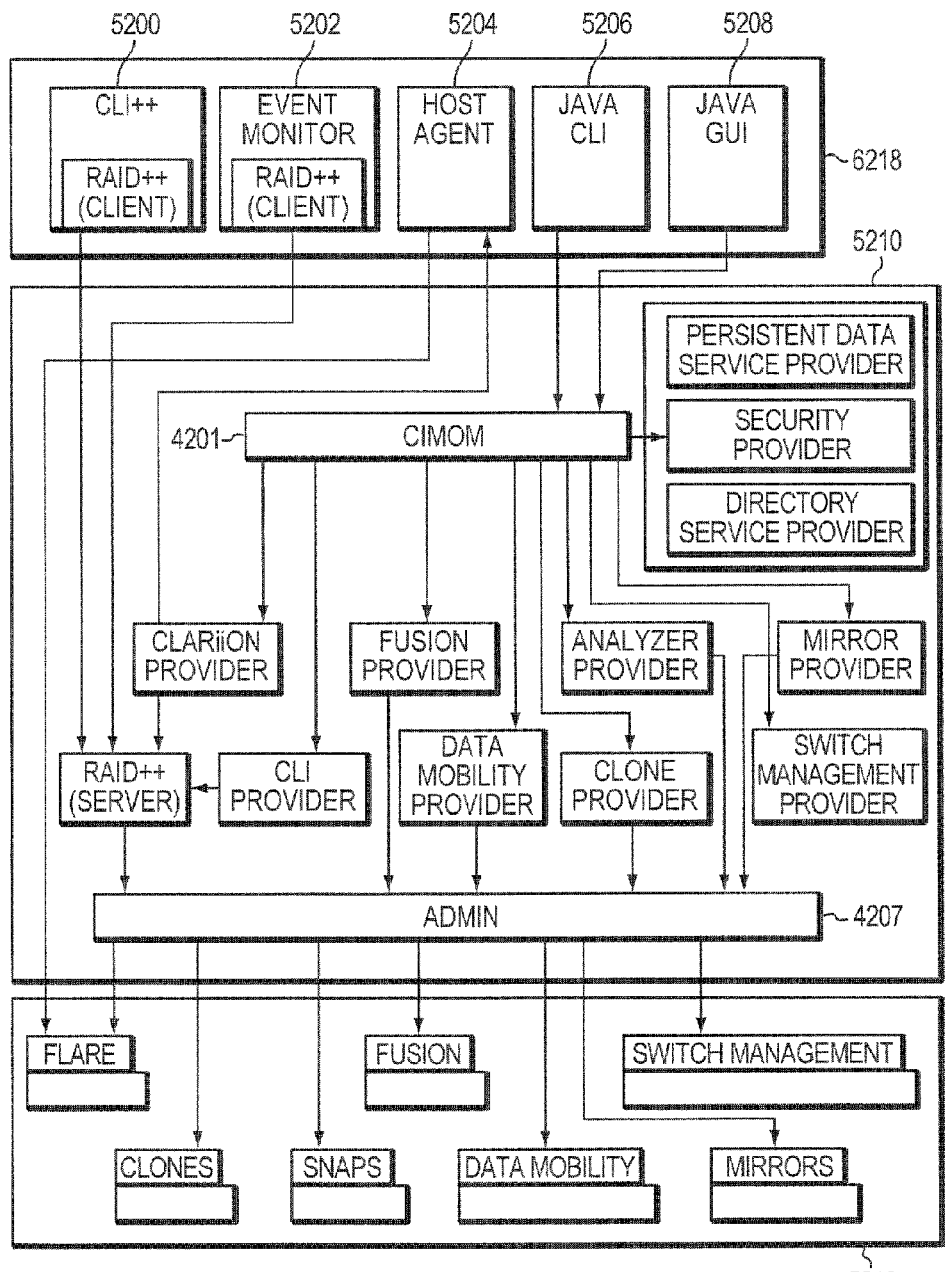

FIG. 13 illustrates a more detailed example of the arrangement described in FIGS. 11-12 showing location and relationships of components to each other. The components may use various communications methods and protocols. The following describe the function of each of the major components and their interfaces to associated functions.

Several components of system management reside on host computers and are referred to as client components and are shown in group 6218. One component in particular, Raid++, has both a client and server instance, shown respectively in host/client group 6218 or server group 5210. Other components include the C++ Command Line Interface CLI 5200, the Java CLI 5206, the Java GUI 5208, the Host Agent 5204, and the Event Monitor 5202.

The server side management components shown in group 5210 interact with the user interfaces and tools for administering the system configuration and operation and to report on system operation. The server side components are comprised of middleware which resides between the user and the storage management components of the system which implement management system storage features. The server side components are basically divided into two groups, the legacy Raid++ module which provides the majority of the management services and the CIMOM and its providers. The Raid++ module uses a proprietary transport to communicate with management clients such as the CLI++. The Raid++ module maintains an object model of the system that it uses for managing the system; it updates the model repeatedly (e.g., periodically) by polling the system as described in more detail below. The CIMOM CLARiiON Provider is essentially a wrapper for the Raid++ classes and methods and translates GUI initiated CIM XML commands into calls to Raid++ to fulfill requests.

(With reference to FIG. 13, in at least some implementations, the CLI provider interacts with multiple providers, such as CLARiiON Provider, instead of with RAID++ directly.)

The management functions not provided by Raid++ are provided by the series of CIMOM providers which are attached to a CIMOM. The CIMOM provides common infrastructure services such as XML coding/decoding and HTTP message transport. The hosted services exclusively implemented in CIMOM providers are: Analyzer Provider—Provides statistics about performance of traffic on ports on the switch; CLI Provider—This provider implements services to allow CLI clients to access CIM managed services such as Clone, Analyzer, Fusion, and switch management; Clone Provider—Provides services to manage the configuration and operation of clones; Data Mobility Provider (e.g., SANCopy provider)—Provides services to manage the configuration and operation of data migration between storage volumes transparently to the host applications using the storage; Fusion Provider—Provides services to configure and manage the combining of LUNs to create new LUNs of larger capacity; Mirror Provider—Provides services to manage the configuration and operation of mirrors; and. Switch Management Provider—Provides services to configure and manage the attached intelligent switch components.

The above-described providers periodically poll the system infrastructure to build and update a model of the existing component configuration and status. If any changes are detected in configuration or status from the existing model, registered observers are notified of the changes and the model is updated with the new model and saved for queries by the provider. The services of these providers can be accessed from other providers by formulating XML requests and sending them to the CIMOM. This permits providers which require the services of other providers (such as Raid++ through the CLARiiON Provider or the CIM local services such as persistent storage, directory services, or security) to access those services. Additionally Admin STL Driver Access through the server side provides access to these providers to the drivers and services of an SP as shown in group 5218, including to the following drivers: Flare, Clones, Snaps, Fusion, and mirrors and services for switch management and data mobility.

Other Service Providers are shown in group 5212 of the server group 5210, and include the Persistent Data Service Provider, Security Provider, and Directory Service Provider. A purpose of the Persistent Data Service Provider is to assure that any data written to its own file mechanism is propagated to all nodes in the management system domain, including its peer storage processor (SP), and this interaction is performed via network requests.

The Security Provider supports authentication of users and authorization of user roles. The Directory Service Provider is used to obtain the network addresses of the systems in a domain of managed system management instances.

Figure 14A:
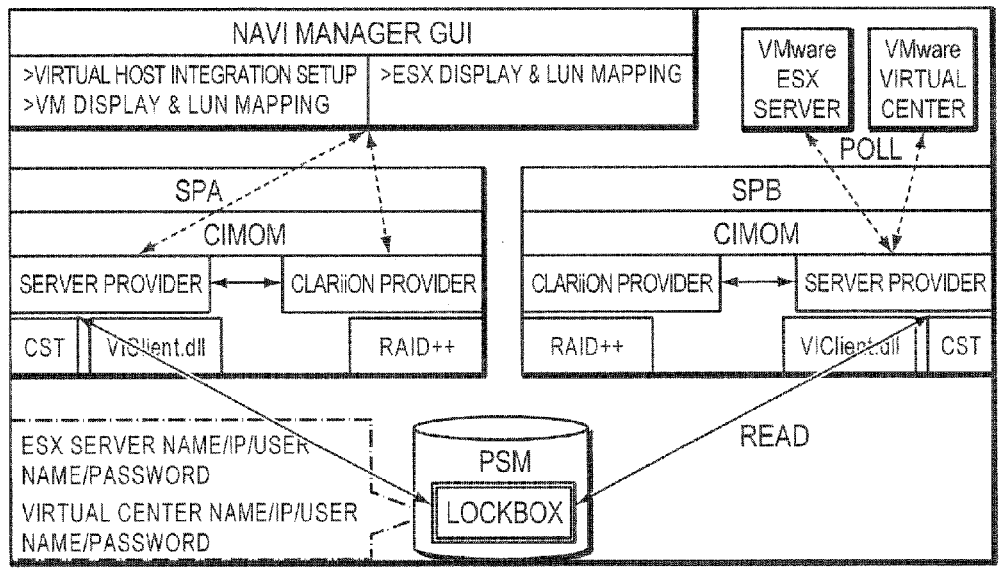
Figure 14B:
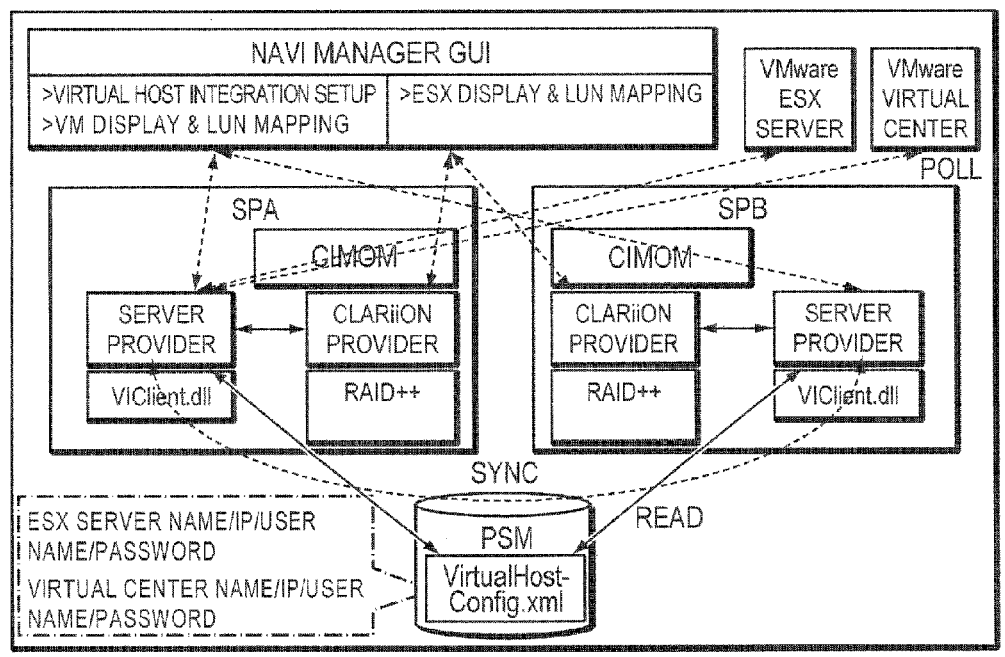

With respect to the storage mapping technique, FIGS. 14A-14B illustrate an example implementation having communication among specific functional items of an EMC CLARiiON data storage system and a VMWare virtualization system described above, for discovery and display (e.g., hierarchical display) of virtual machines within attached ESX servers, display of relationship among CLARiiON LUNs, ESX servers, and virtual machines, and display of end-to-end device mapping information from virtual machines to the CLARiiON LUN level. The CLARiiON data storage system contacts ESX server Web services over IP to retrieve information about virtual machines of the ESX server.

Support is provided to the management system's GUI and CLI for virtual server integration setup. As described below, the system polls Virtual Centers and ESX servers and correlates the ESX server and virtual machine information with EV_Server/EV_LUN object information on the data storage system. The server provider on the data storage system hosts virtual server integration related objects and logic and, in some implementations, hosts all server related objects and logic. The server provider supports retrieval and saving of ESX contact information, and polls the Virtual Center and/or the ESX server for ESX server and VM information. In addition, the server provider creates and holds objects for virtual machines. The server provider also sets an EV_Server object in the CLARiiON provider to its corresponding server type and sets ESX specific information to EV_StorageEntry of an EV_AttachedServer object in the CLARiiON provider. This allows end to end mapping as described below, which, for example, allows LUNs to be correctly mapped, remapped, or transferred in failover situation (204) of FIG. 9.

In particular, FIGS. 14A-14B illustrate a version of the system of FIG. 13 in which each of two storage processors in the data storage system has a corresponding group 5210 which includes the server provider which is in communication with the CLARiiON provider. The server provider uses client connection software ("VIClient" or "VIClient.dll") together with password and other credentials (e.g., from a persistent storage (PSM) lockbox mechanism) to access and poll a VMware ESX server and/or a VMware Virtual Center for virtual machine information that is used to map virtual machines to the data storage system's LUNs as described below.

Figure 15:
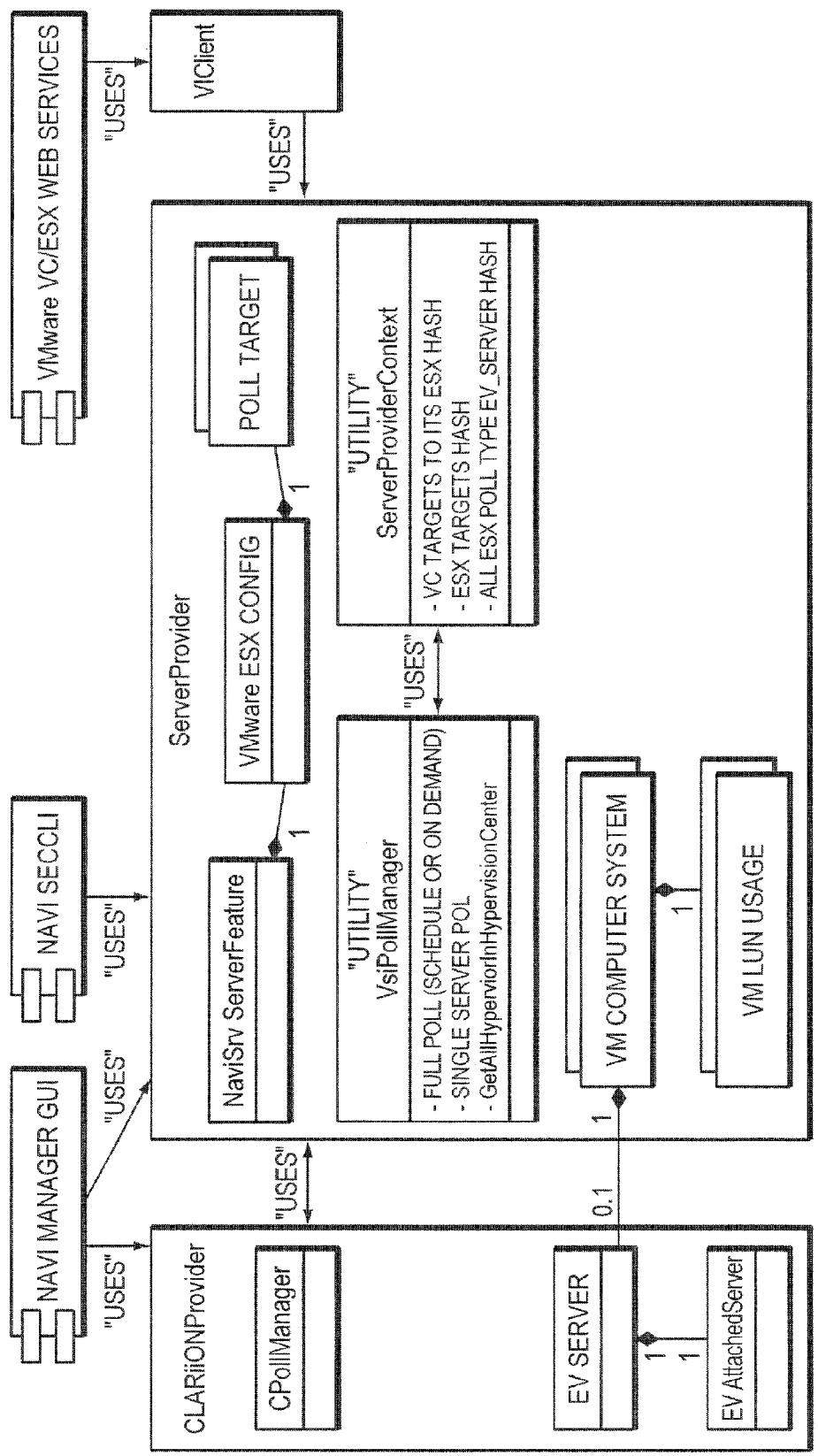
FIGS. 15-20, 22-23, 25, 27-28 are diagrams of interactions among software logic for use with techniques described herein.

FIG. 15 illustrates components and functionality of the CLARiiON provider and the server provider. A Navi Manager GUI (which may be, include, or be included in GUI 5208) is responsible for set up and display and displays the ESX server and the virtual machines under the ESX server in an enterprise storage manager application (ESM). The Navi Manager GUI also supports ESX related information and device mapping in an ESX and VM properties dialog, and supports virtual server integration setup, which is also supported by a Navi Manager SECCLI (which may be, include, or be included in CLI 5206). The CLARiiON provider supports the GUI display and gathers and supplies LUN and server information, particularly by polling an operating system ("Flare") of the data storage system for LUN and server registration information, and supporting GUI requests. A RAID++ component supports the CLARiiON provider and polls Flare to gather and supply LUN and server information, particularly by processing an HBA port list, generating EV_Server and EV_AttachedServer objects, and supporting polling of an agent on EV_Server to EV_AttachedServer to EV_ServerAttribute. The server provider polls the agent and hypervisor and supports virtual server integration setup and virtual server integration display, by gathering and supplying VMware ESX server and virtual machine runtime and device mapping information, particularly by supporting a Navi virtual server integration wizard and Navi Manager SECCLI in retrieving/adding/updating/removing ESX contact information, setting/unsetting EV_Server in the CLARiiON provider to ESX Server Type, polling the Virtual Center and/or the ESX server for ESX and virtual machine information on scheduled server poll interval, creating objects for virtual machines which hold virtual machine name/IP/OS and device mapping, and setting ESX specific information to EV_StorageEntry and EV_AttachedServer objects in the CLARiiON provider. VIClient.dll supports the server provider and contacts the Virtual Center and/or the ESX server web services (e.g., module 421 and/or service 422 for ESX and/or virtual machine information. Lockbox supports security for the server provider and encrypts and saves credential information in a VirtualServerConfig.xml file in a lockbox to persistent storage.

Figure 16:
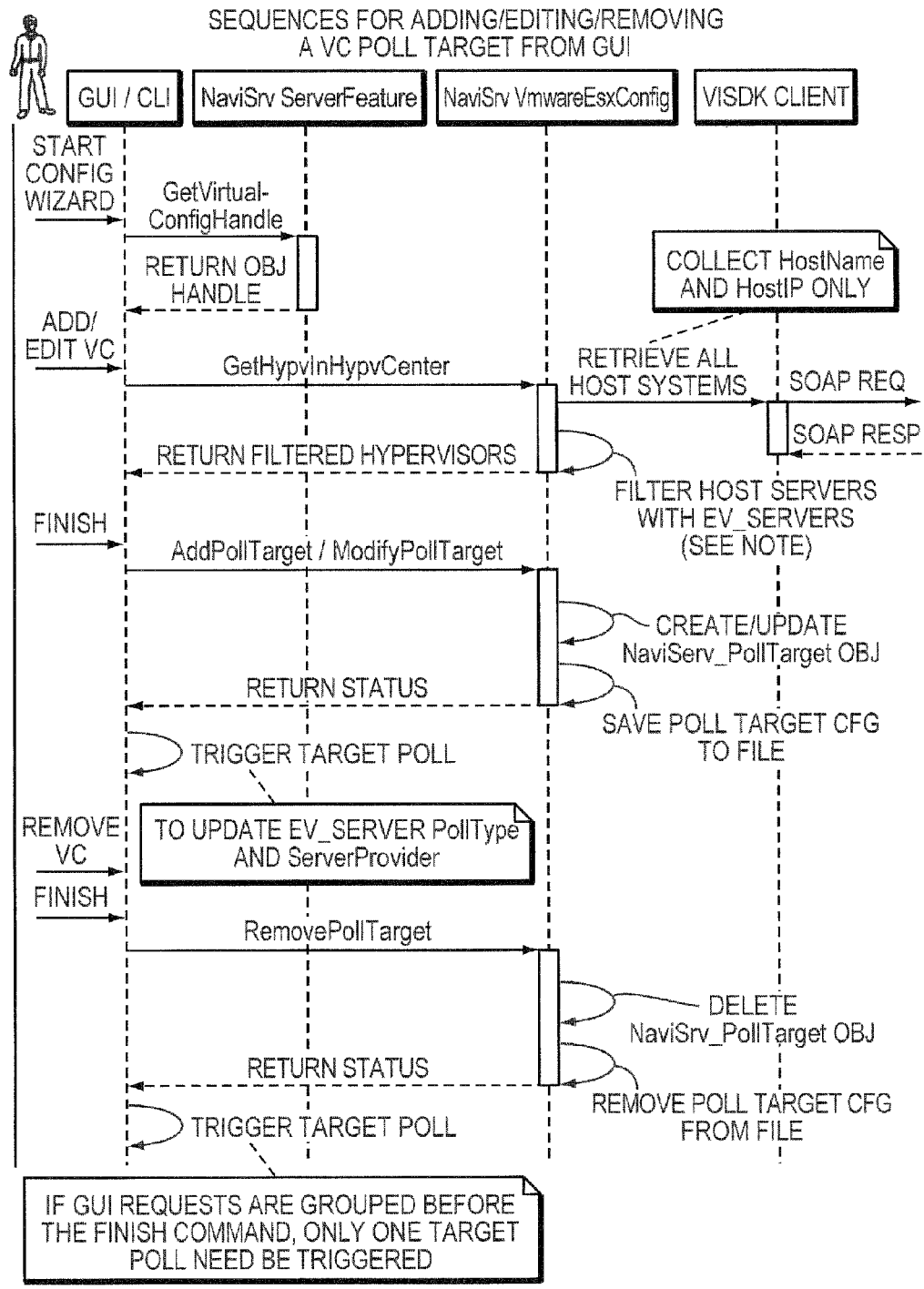
Figure 17:
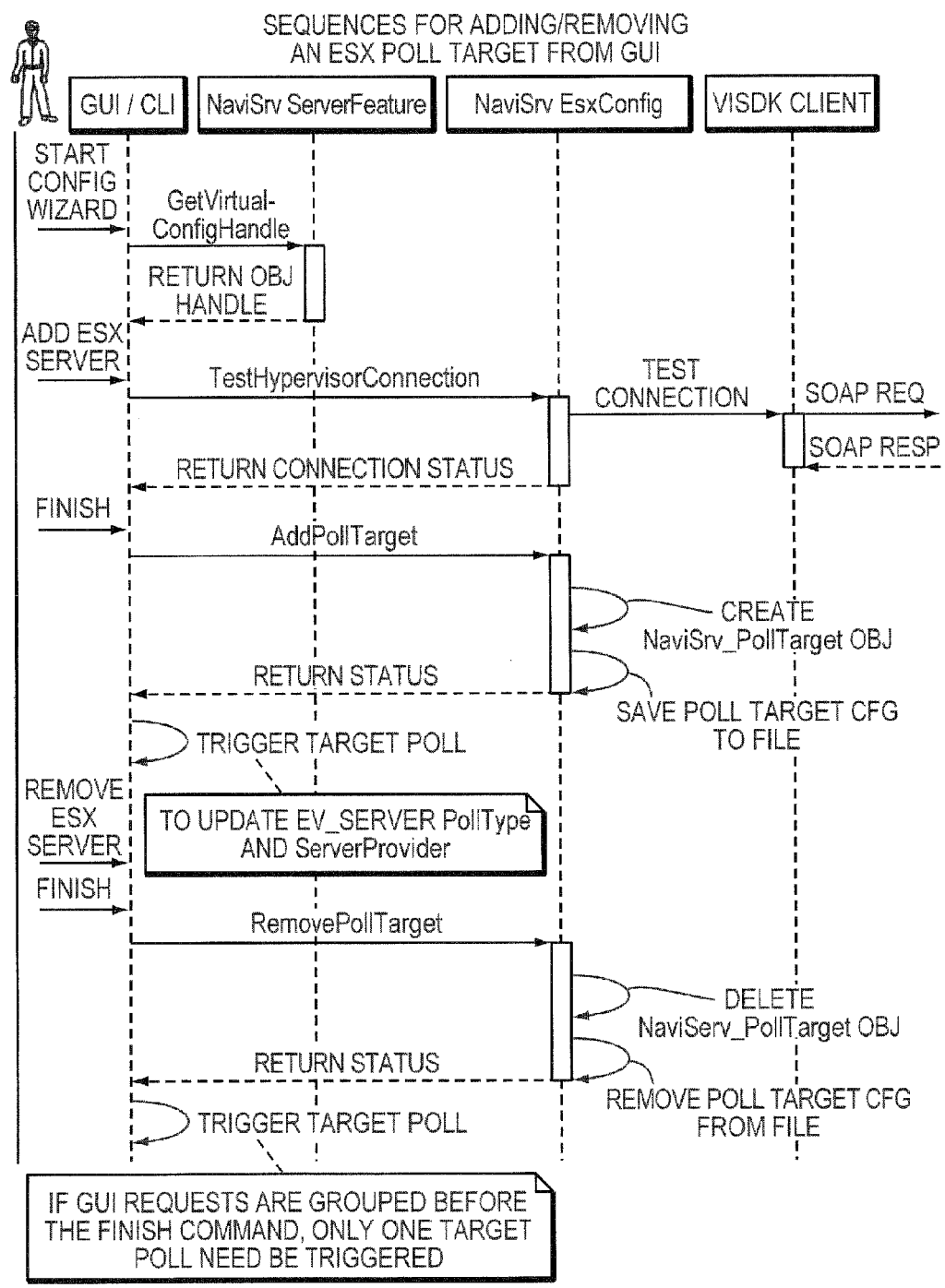

FIGS. 16, 17 illustrate procedures ("sequences") for adding/editing/removing poll targets from the GUI for the Virtual Center and the ESX server, respectively. In particular, with respect to adding a Virtual Center, the Virtual Center is queried using Simple Object Access Protocol (SOAP) for all of its hypervisors, the results are filtered for hypervisors in communication with the data storage system, and the filtered results are used to create poll targets corresponding to such hypervisors. With respect to adding an ESX server, a connection to the ESX server is tested using SOAP, and a poll target is created corresponding to the ESX server.

In a specific implementation, a push/registration from the ESX servers by agent or ESX server kernel to the CLARiiON system gives, to Navi Manager, ESX server information including name and IP address. Navi Manager can detect whether the server is an ESX server from the push/registration information and allows users to enter ESX credentials for it. The result is filtered with the known ESX servers on the data storage system from the push/registration.

Figure 18:
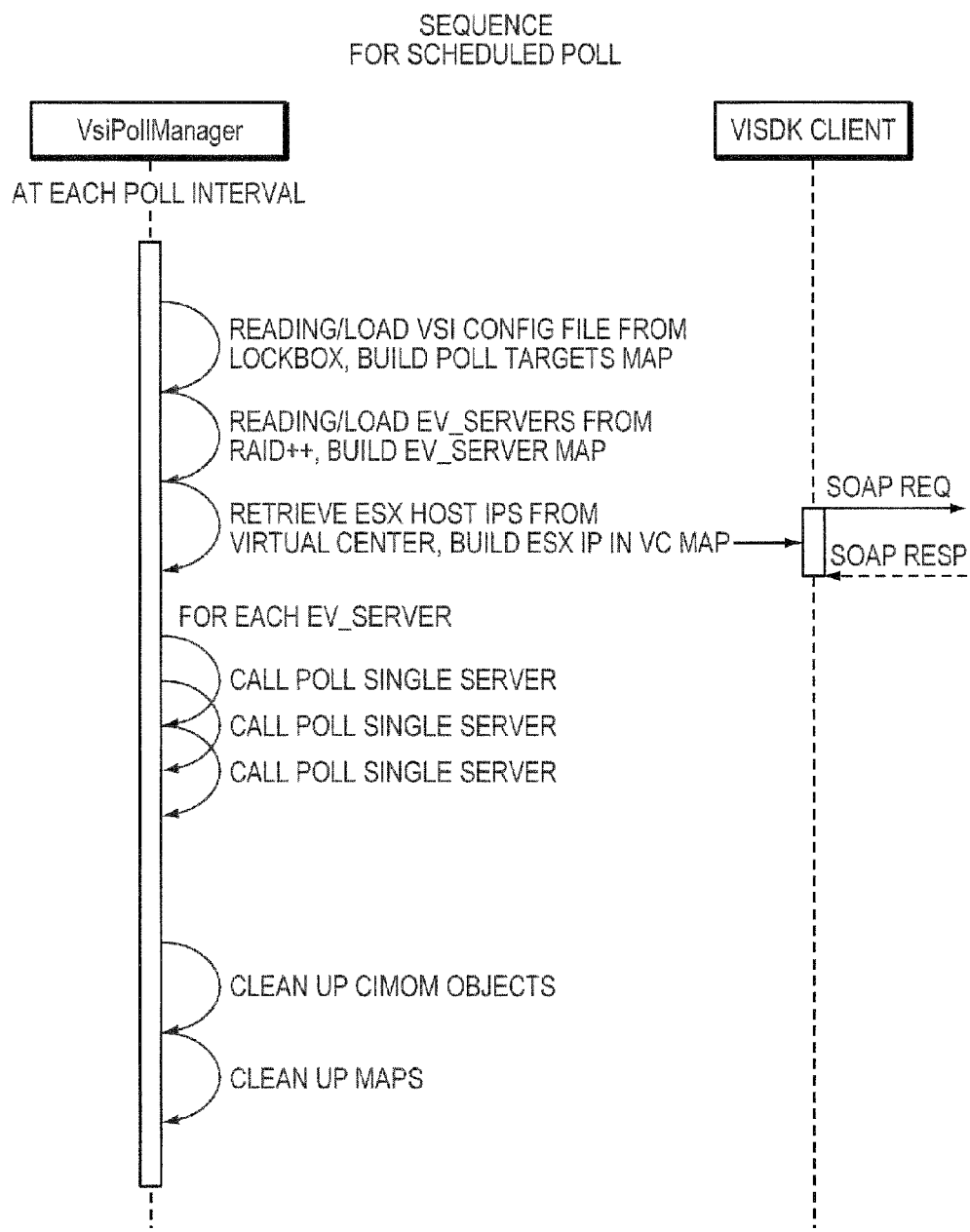

FIG. 18 illustrates a sequence for a scheduled poll, in which, at each poll interval, the credential information in the VirtualServerConfig.xml file is retrieved and a poll targets map is built, EV_Server objects are retrieved and an EV_Server map is built, ESX server IP addresses are retrieved from the Virtual Center and are mapped with respect to the Virtual Center, and for each EV_Server object, the corresponding server is polled.

Figure 19:
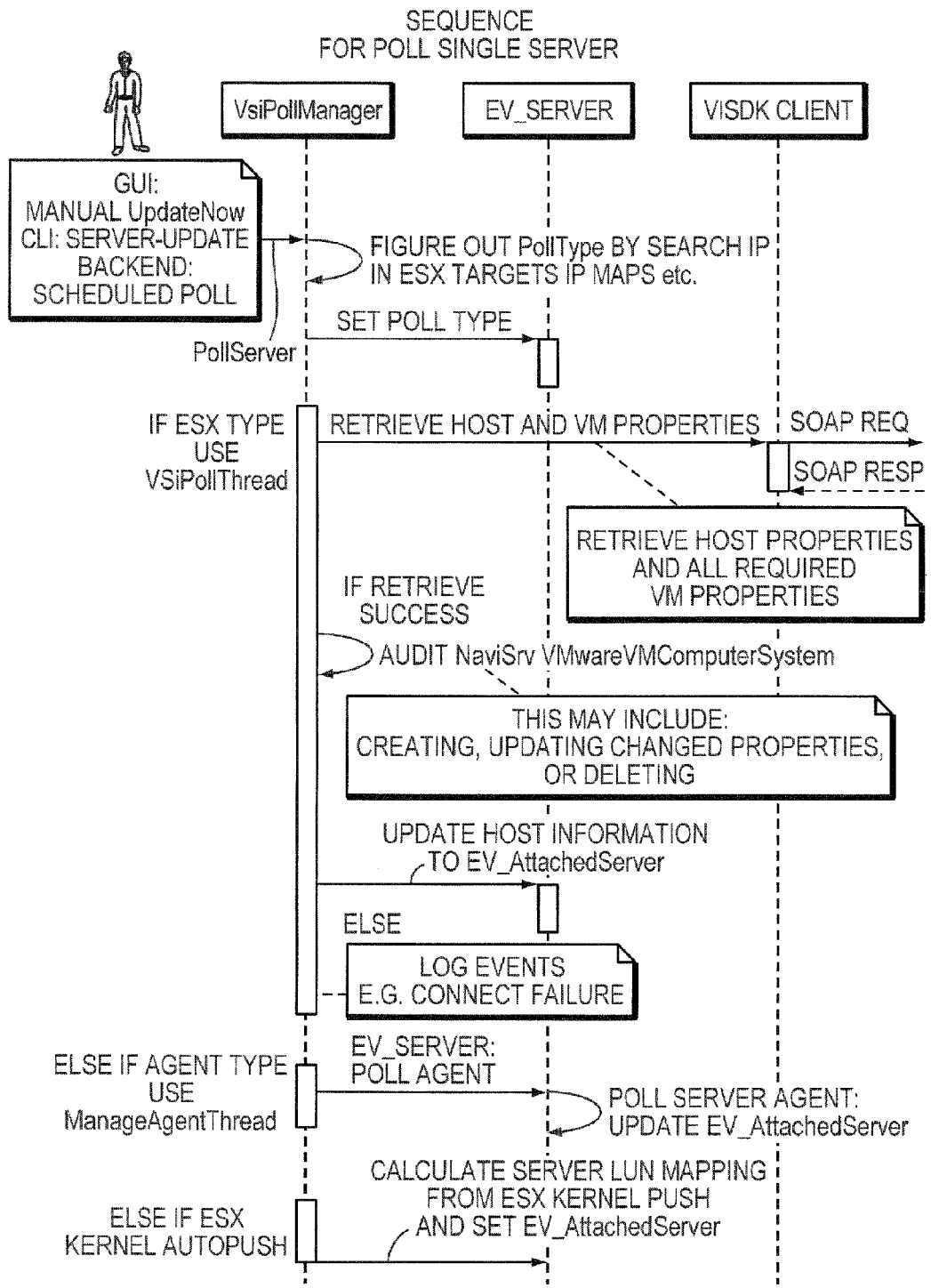

FIG. 19 illustrates a sequence for polling a single server, which takes into account whether the server is an ESX server, in which case host and virtual machine properties are retrieved and updated server information is supplied to the EV_AttachedServer object.

Figure 20:
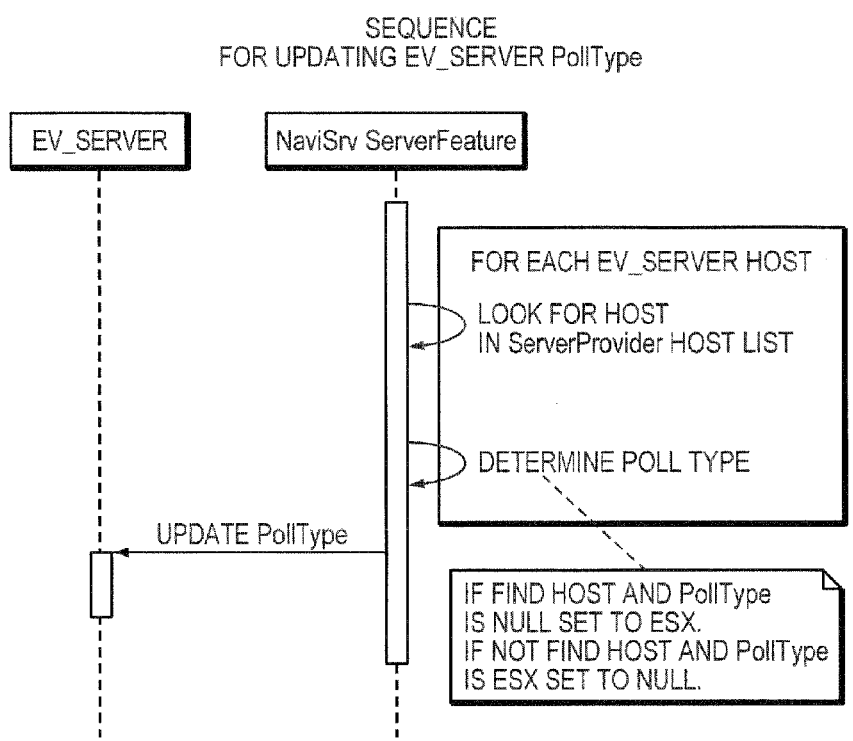

FIG. 20 illustrates a sequence for updating the EV_Server poll type.

With respect to filtering server provider hosts, filtering the hosts is the process in which the server provider compares its list of hosts retrieved using the poll target list with the list of hosts represented by EV_Servers which are hosts the CLARiiON provider is aware of. If the poll target is an un-managed ESX server, the poll target adds at most one host to the server provider host list. If the poll target is a Virtual Center, the poll target adds potentially multiple hosts to the server provider host list. The filtering action requires coming up with the filtered host list which is an "AND" of the CLARiiON provider host list with the server provider host list, as in the following example.

ClariionProvider EV_Server based Host List=[Host_1, Host_3]
AND
ServerProvider PollTarget Host List=[Host_1, Host_2]
- - -
Filtered Host List=[Host_1]

With respect to host data structure cleanup, this action initiates updating/cleaning-up of the server provider data structures representing the current ESX servers known to exist by the provider. Cleanup run after a host filtering sequence can use the filtered host list as the reference and ESX related data structures are then updated to match this list.

Figure 21:
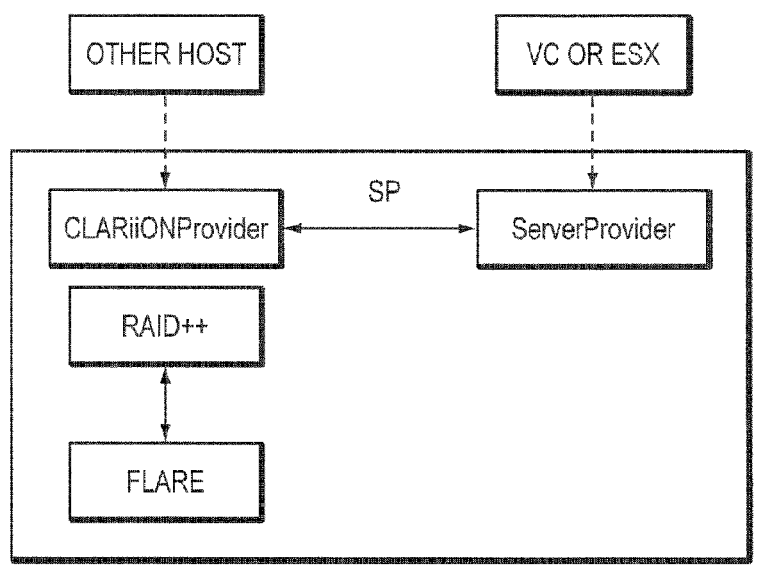

FIG. 21 illustrates that Virtual Center or ESX server hosts are handled by the server provider while other types of hosts are handled by the CLARiiON provider.

Figure 22:
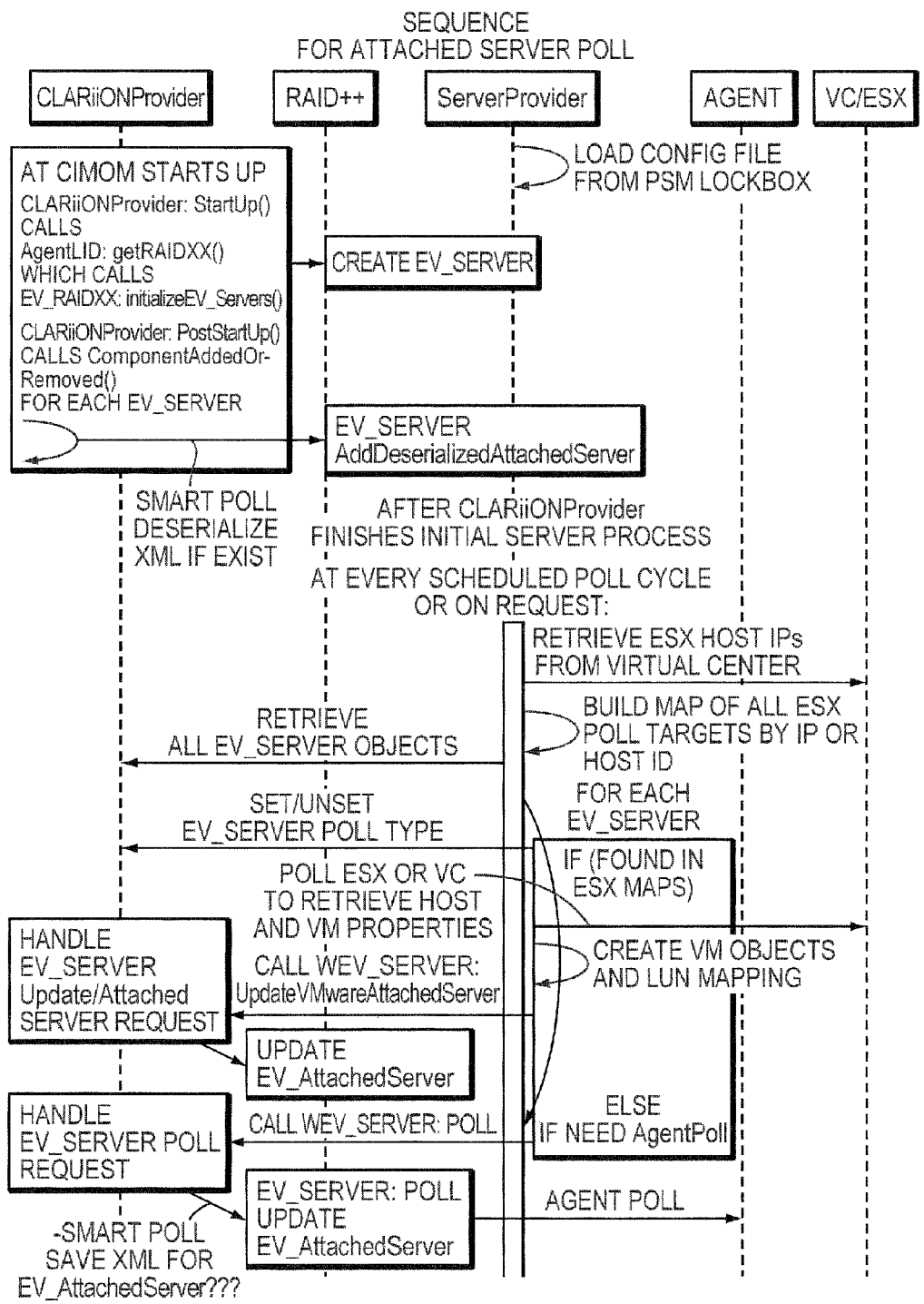

FIG. 22 illustrates a sequence for an attached server poll, in which the VirtualServerConfig.xml is loaded and the EV_Server object is created, and at every scheduled poll cycle or on request ESX server IP addresses are retrieved from the Virtual Center and a map of ESX poll targets by IP address or host identifier is built, and all EV_Server objects are retrieved. For each EV_Server object found in the map, the EV_Server poll type is updated, and the Virtual Center or ESX server host is polled to retrieve host and virtual machine properties, and virtual machine objects and LUN mapping are created.

Figure 23:
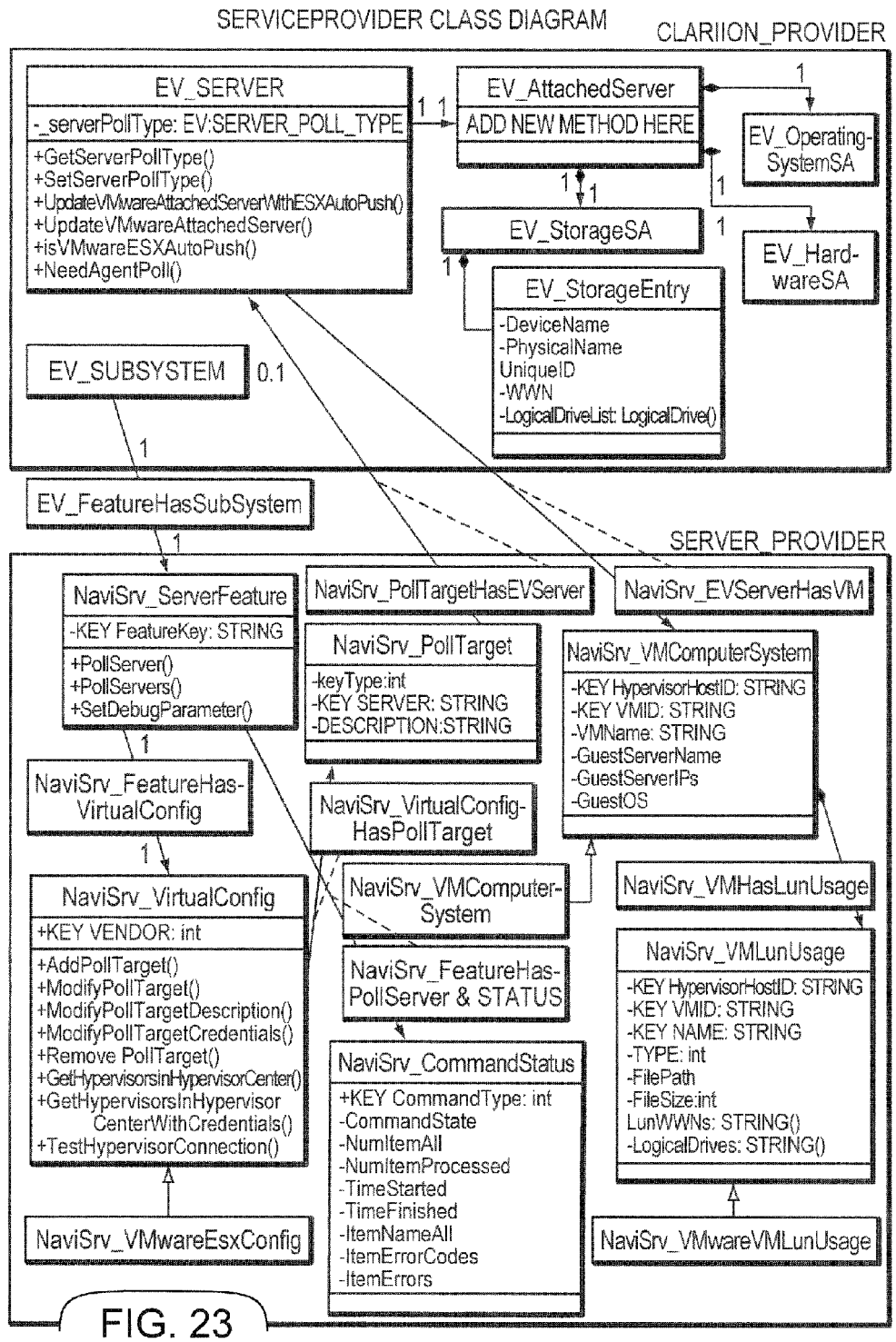

FIG. 23 illustrates classes of the CLARiiON provider and the server provider in an example implementation.

Figure 24:
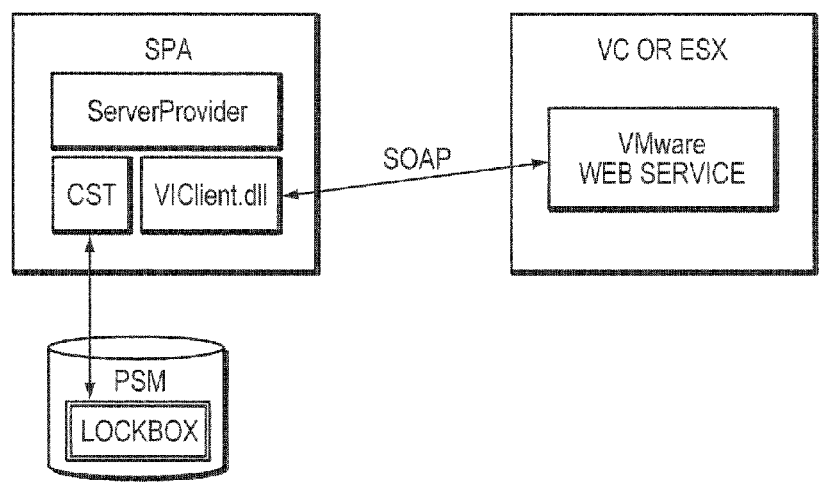

FIG. 24 illustrates that the server provider uses VIClient.dll to communicate using SOAP with Web services of the Virtual Center or ESX server.

Figure 25:
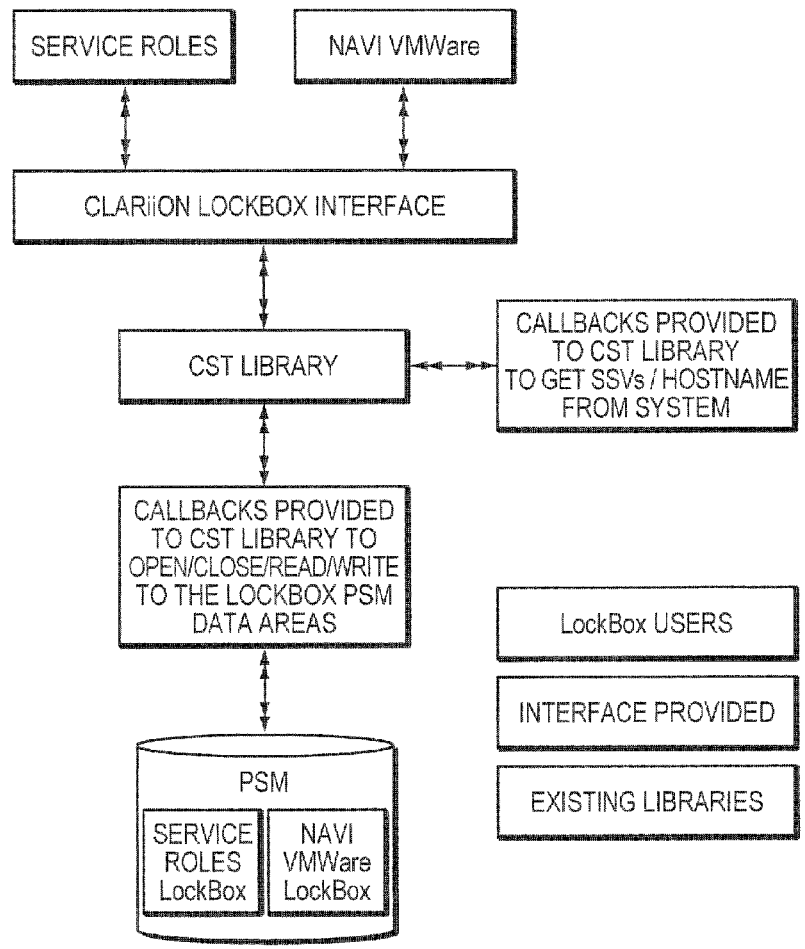
Figure 26:
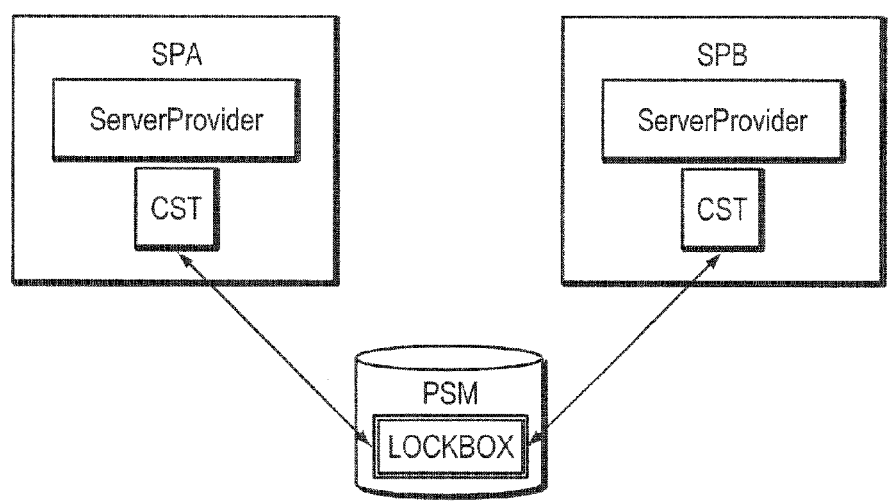

FIGS. 25-26 illustrate an example implementation in which the credentials are stored in persistent storage using a CLARiiON lockbox interface which is accessible to the server provider.

Figure 27:
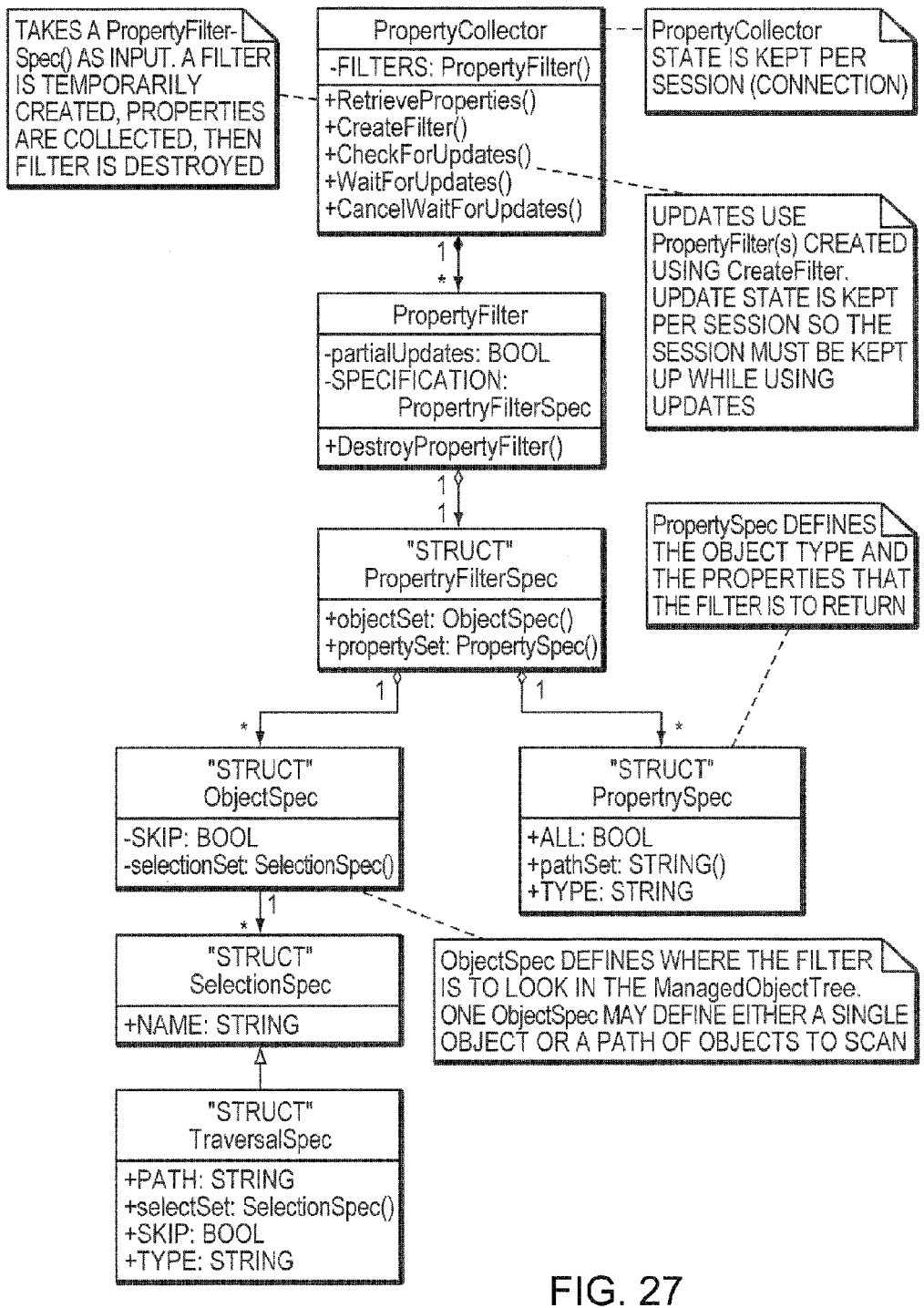

FIG. 27 illustrates a general class structure used for constructing filters to retrieve/collect object and object properties from a VMware Infrastructure API (VISDK) provided for accessing VMware web services which are built-in on every ESX server and Virtual Center.

Figure 28:
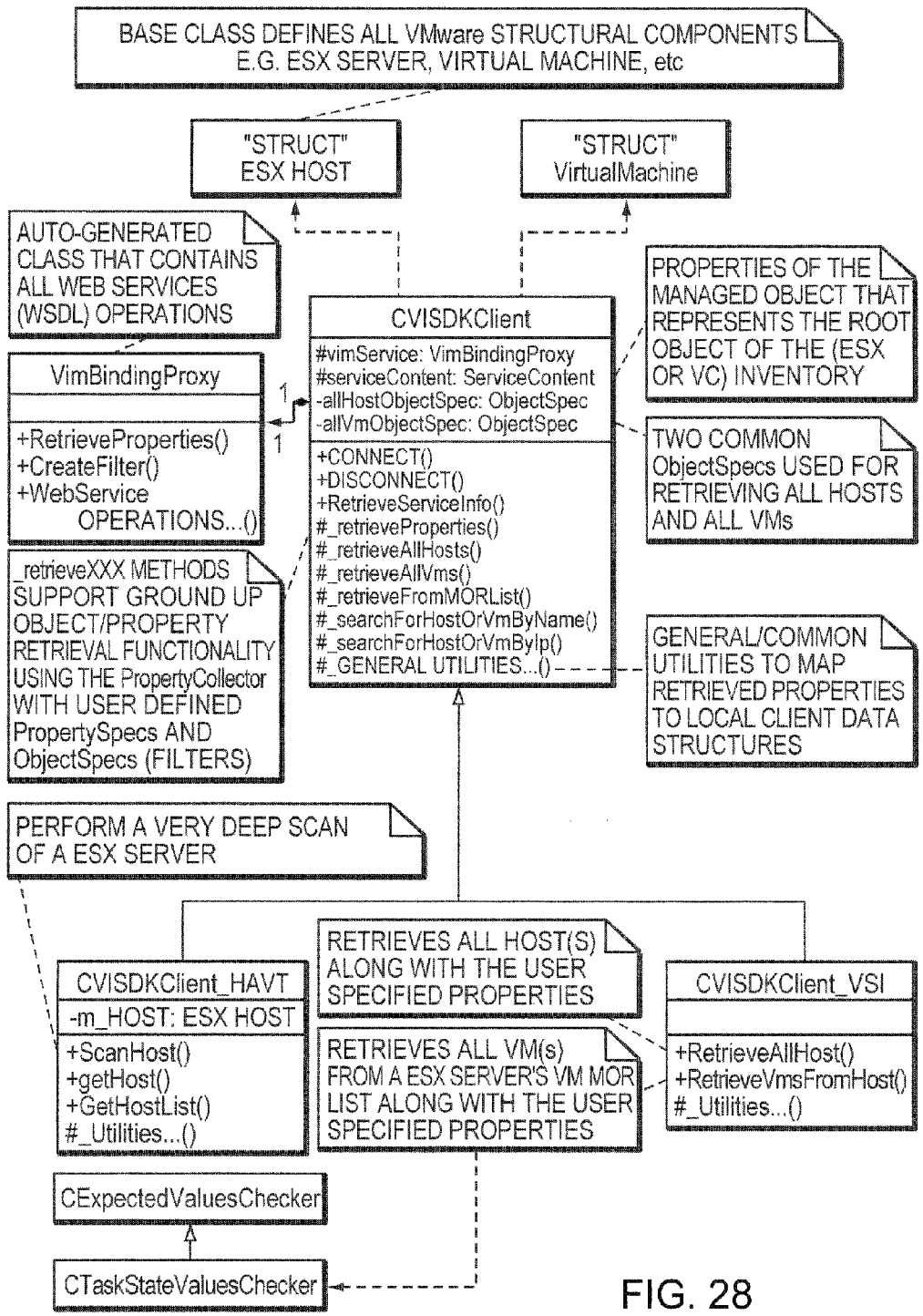

FIG. 28 illustrates a general class structure used for an example implementation of a VISDK client application for accessing VMware web services.

Figure 29:
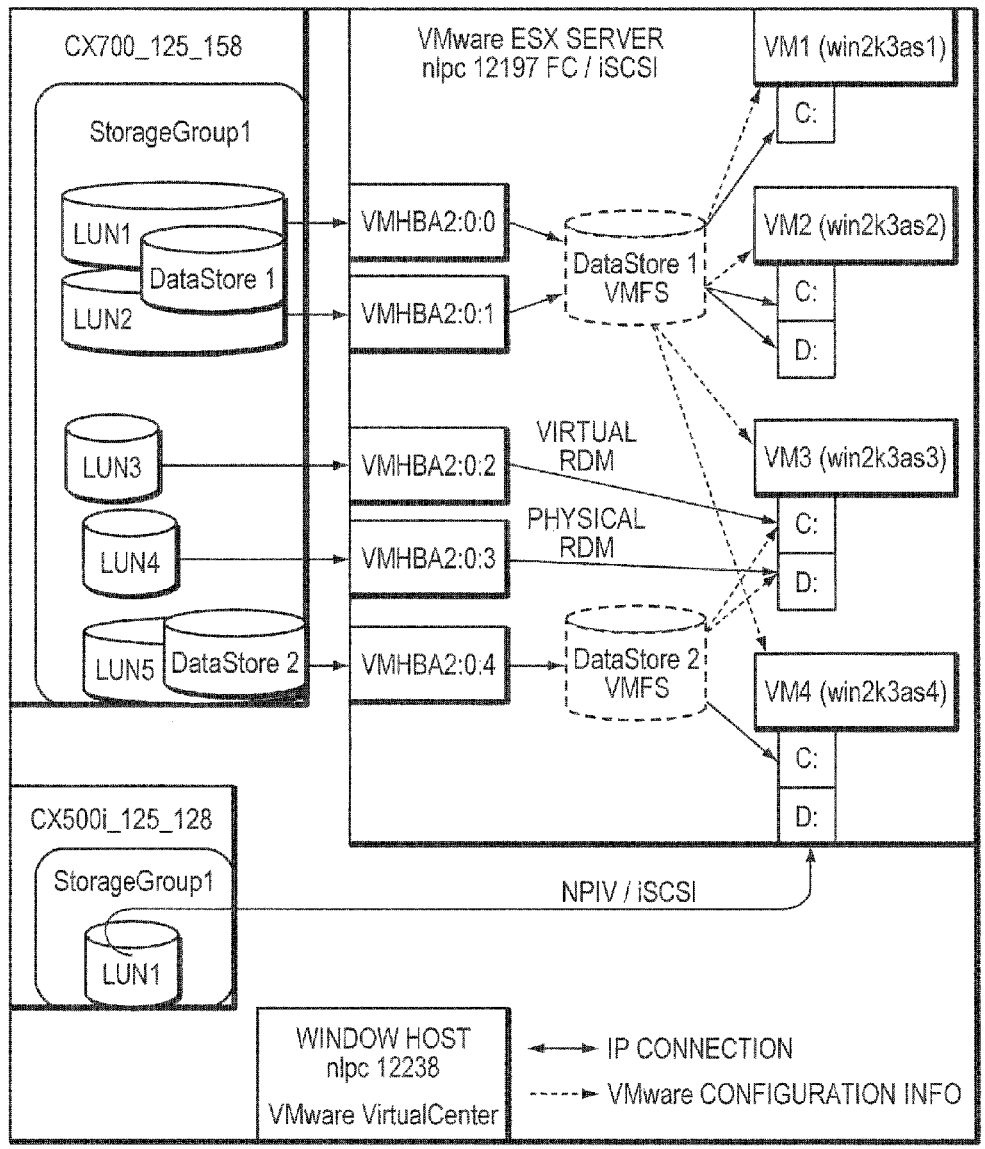

FIGS. 29-30 illustrate a sample VMware configuration and end to end mapping in accordance with the storage mapping technique described herein. For example, volume LUN1 of storage group StorageGroup1 of data storage system CX700_125_128 is mapped as volume vmhba2:0:0 used for virtual disk Hard Disk 1 (C:\) by Windows 2003 virtual machine VM1/winw2k3as1 of ESX server esx 12197.

In a specific implementation, the VMware web services are used to find the VMware ESX device name and UUID. If the device is a CLARiiON LUN (by vendor ID), the VMware ESX device UUID is parsed to get a string that matches the CLARiiON LUN WWN. For Esx3.x, the VMware device UUID is in the following format shown by example:

"02000100006006016080de61500de61e6e4e28bdd11524 149442035"

Digits 11 to 42 are extracted to get the 32 digit CLARiiON LUN WWN.

For ESX4.x, the device format is as follows, shown by example:

"naa.60060160ded81500de61e6e4e28bdd11"

The "naa." prefix is removed to get the CLARiiON LUN WWN.

Figure 31:
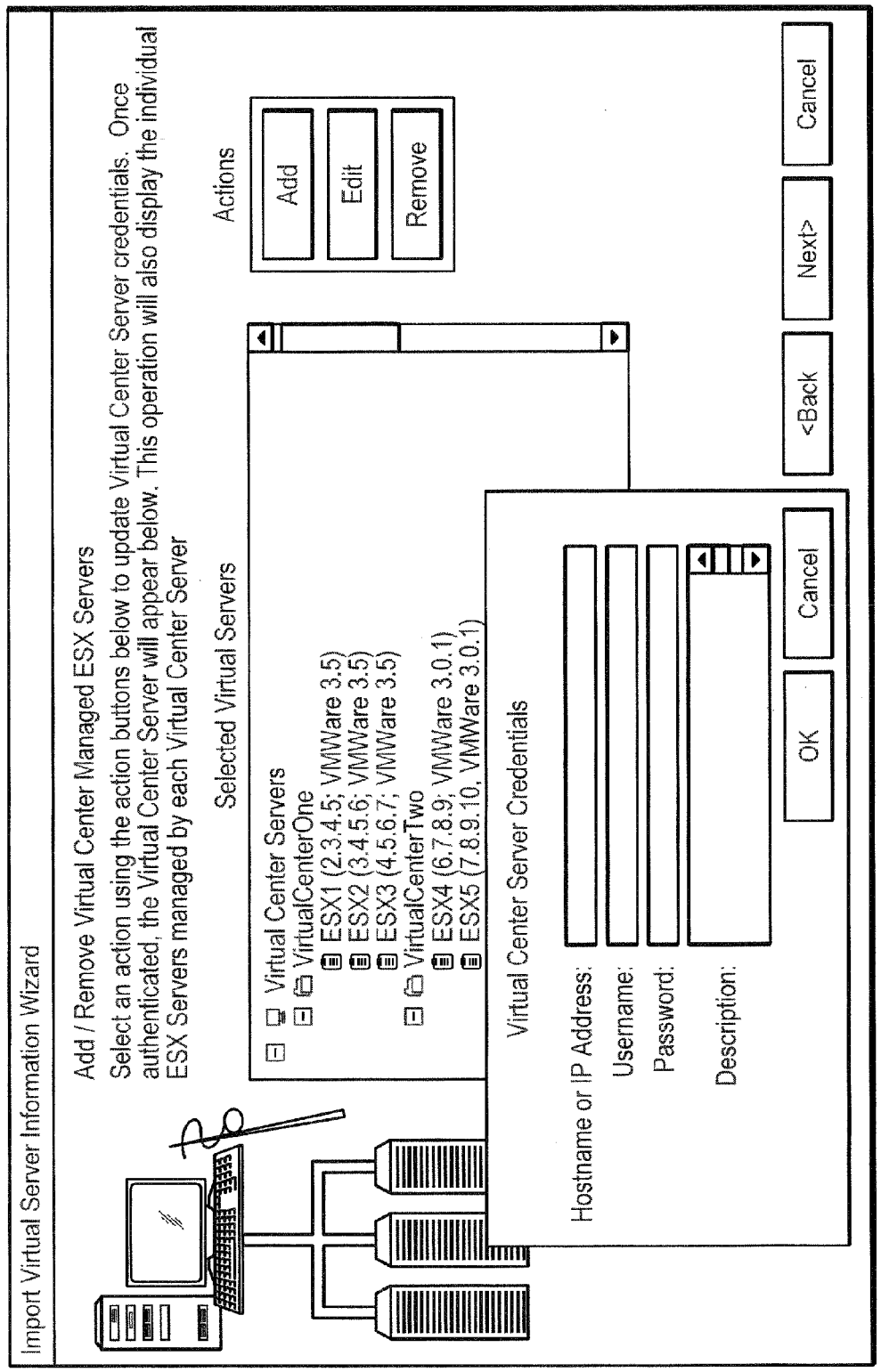

FIG. 31 illustrates an example implementation in which the user may enter credentials for use in accessing the Virtual Center so that, for example, Virtual Center managed ESX servers may be added or removed.

Figure 32:
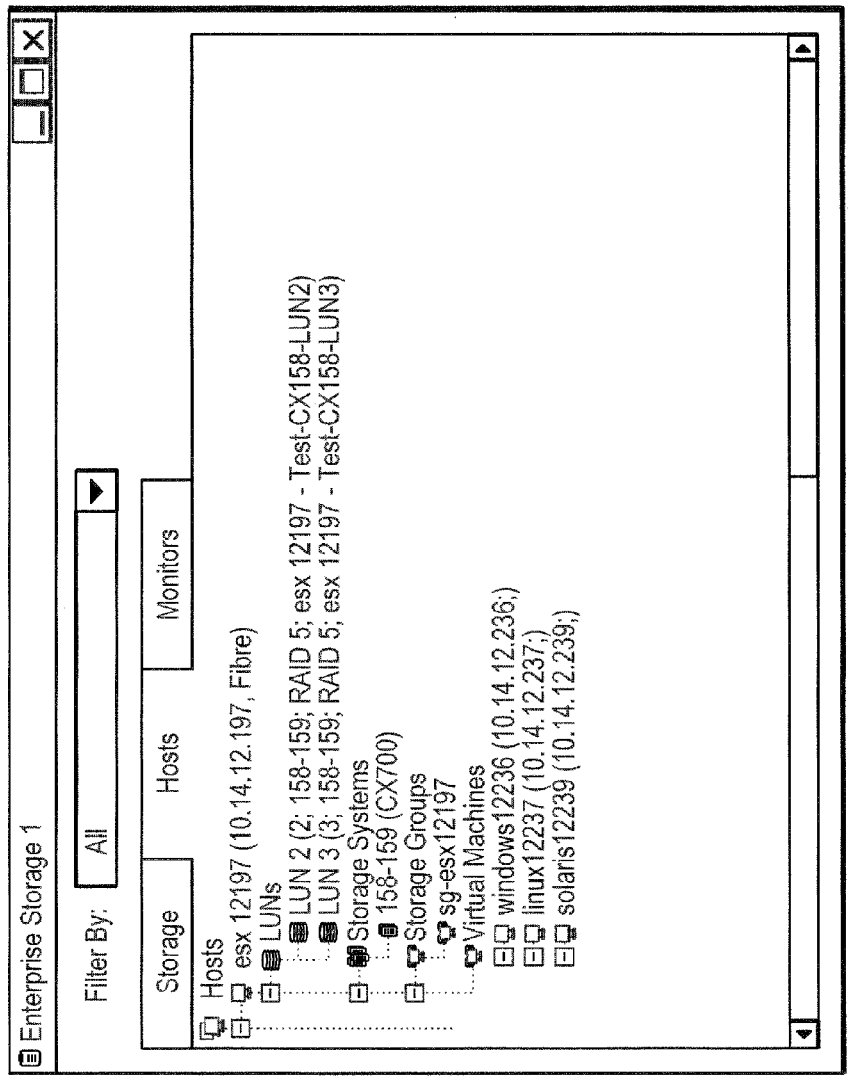
Figure 33:
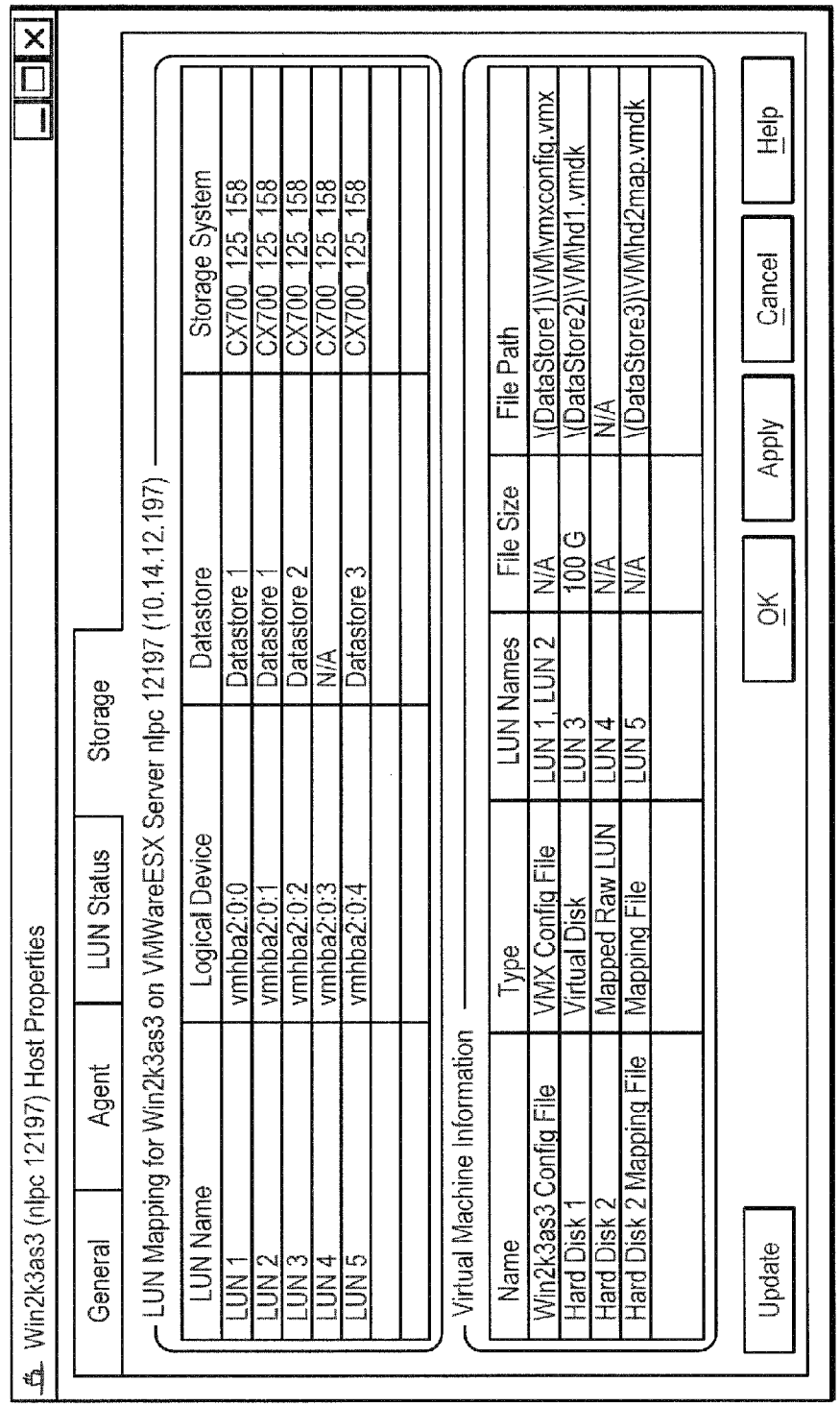

FIG. 32 illustrates that the management system may show that each ESX server host several virtual machines, and FIG. 33 illustrates sample items for display in virtual machine host properties dialog.

Figure 8:
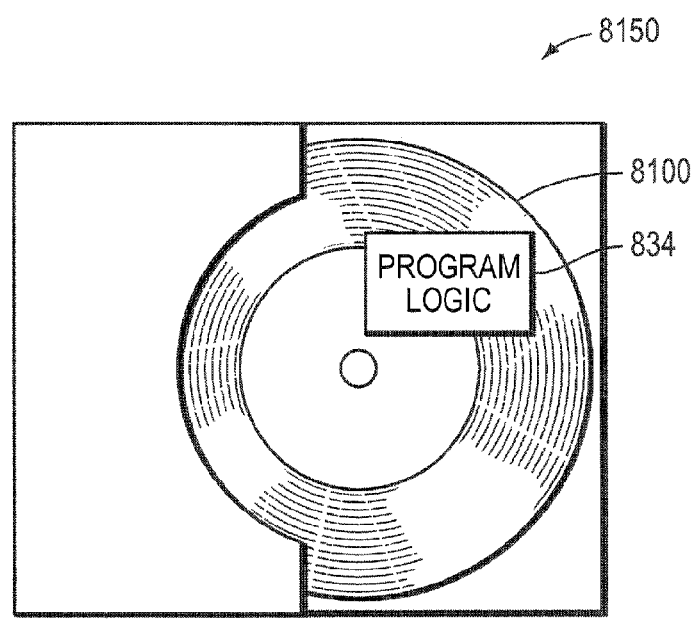
FIG. 8 is an illustration of a computer medium including software described herein.

Referring to FIG. 8, Program Logic 834 may include computer software for carrying out the storage mapping technique described herein, although it is possible for it to be embodied in whole or part in hardware or firmware. Program Logic 834 may be embodied on a computer program product 8150 including a computer-readable medium 8100, and wherein the Logic is encoded in computer-executable code configured for carrying out steps of a method embodiment of this invention. The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission. It may be implemented such that herein, when the program code is received and loaded into and executed by a machine, such as a computer, the machine becomes an apparatus for practicing the invention. When implemented on one or more general-purpose processors, the program code combines with such a processor to provide a unique apparatus that operates analogously to specific logic circuits.

Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. A method for use in mapping data storage and virtual machines, the method comprising:
   providing, from a physical data storage system having a plurality of disk drives, a logical volume configured for use by a hypervisor;
   querying, from the physical data storage system, the hypervisor, through a web service, to identify a virtual machine of the hypervisor, wherein credentials are entered for accessing the hypervisor, and wherein the credentials are stored in persistent storage associated with the physical data storage system using a lockbox mechanism;
   polling, the virtual machine for storage usage information, wherein polling includes using the credentials to access the virtual machine from the physical data storage system;
   determining, at the physical data storage system, that the virtual machine is using the logical volume; and
   identifying, at the physical data storage system, a set of physical disk drives associated with the logical volume being used by the virtual machine.

2. The method of claim 1, further comprising:
   displaying an indication that the virtual machine is using the logical volume.

3. The method of claim 1, further comprising:
   displaying an indication of end-to-end storage mapping between the virtual machines and the logical volume.

4. The method of claim 1, further comprising:
   contacting an ESX SERVER using ESX SERVER-web services over IP (internet protocol) to retrieve information about virtual machines of the ESX SERVER.

5. The method of claim 1, further comprising:
   contacting VIRTUAL CENTER management software over IP (internet protocol) to retrieve information about virtual machines.

6. The method of claim 1, further comprising:
   polling a VIRTUAL CENTER management software for virtual machine information; and
   correlating the virtual machine information with logical volume object information on the physical data storage system.

7. The method of claim 1, further comprising:
   polling an ESX SERVER virtual infrastructure software for virtual machine information; and
   correlating the virtual machine information with LUN object information on the data storage system.

8. The method of claim 1, further comprising:
   enabling, by a server provider on the data storage system that hosts virtual server integration related objects, retrieval and saving of ESX SERVER virtual infrastructure software contact information.

9. The method of claim 1, further comprising:
   polling, by a server provider on the data storage system that hosts virtual server integration related objects, a VIRTUAL CENTER management software for ESX SERVER virtual infrastructure software and virtual machine information.

10. A system for use in mapping data storage and virtual machines, the system comprising:
    first logic configured to provide, from a physical data storage system having a plurality of disk drives, a logical volume configured for use by a hypervisor;
    second logic configured to query, from the physical data storage system, the hypervisor, through a web service, to identify a virtual machine of the hypervisor, wherein credentials are entered for accessing the hypervisor, and wherein the credentials are saved to the physical data storage system;
    third logic configured to determine, from the physical data storage system, that the virtual machine is using the logical volume; and
    fourth logic configured to, at the physical data storage system, identify a set of physical disk drives associated with the logical volume being used by the virtual machine.

11. The system of claim 10, further comprising:
    fifth logic configured to display an indication that the virtual machine is using the logical volume.

12. The system of claim 10, further comprising:
    fifth logic configured to display an indication of end-to-end storage mapping between the virtual machines and the logical volume.

13. The system of claim 10, further comprising:
    fifth logic configured to contact an ESX SERVER using ESX SERVER-web services over IP (internet protocol) to retrieve information about virtual machines of the ESX SERVER.

14. The system of claim 10, further comprising:
    fifth logic configured to contact VIRTUAL CENTER management software over IP (internet protocol) to retrieve information about virtual machines.

15. The system of claim 10, further comprising:
    fifth logic configured to poll a VIRTUAL CENTER management software for virtual machine information; and sixth logic configured to correlate the virtual machine information with LUN object information on the data storage system.

16. The system of claim 10, further comprising:

fifth logic configured to poll an ESX SERVER virtual infrastructure software for virtual machine information; and sixth logic configured to correlate the virtual machine information with logical volume object information on the data storage system.

17. The system of claim 10, further comprising:

fifth logic configured to enable, by a server provider on the data storage system that hosts virtual server integration related objects, retrieval and saving of ESX SERVER virtual infrastructure software contact information.

18. The system of claim 10, further comprising:

fifth logic configured to poll, by a server provider on the data storage system that hosts virtual server integration related objects, a VIRTUAL CENTER management software for ESX SERVER virtual infrastructure software and virtual machine information.

* * * * *